(12) United States Patent
Kitamura et al.

(10) Patent No.: US 7,046,405 B2
(45) Date of Patent: May 16, 2006

(54) COMPUTER-GENERATED HOLOGRAM FABRICATION PROCESS, AND HOLOGRAM-RECORDED MEDIUM

(75) Inventors: Mitsuru Kitamura, Tokyo (JP); Tomohisa Hamano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 33 days.

(21) Appl. No.: 10/320,790

(22) Filed: Dec. 17, 2002

(65) Prior Publication Data

US 2003/0151784 A1    Aug. 14, 2003

(30) Foreign Application Priority Data

Dec. 17, 2001 (JP) .............................. 2001-383338

(51) Int. Cl.
*G03H 1/08* (2006.01)
(52) U.S. Cl. ................................ 359/9; 359/22; 359/32
(58) Field of Classification Search .................... 359/2, 359/9, 22, 32, 33; 283/86
See application file for complete search history.

(56) References Cited

U.S. PATENT DOCUMENTS 5,483,364 A * 1/1996 Ishimoto et al. ............... 359/9

FOREIGN PATENT DOCUMENTS

| EP | 0 590 928 A | 4/1994 |
|---|---|---|
| JP | 11-21793 | 1/1999 |
| JP | 11-202741 | 7/1999 |
| JP | 2001-100622 A | 4/2001 |
| JP | 13-100622 | * 4/2004 |
| WO | WO94/24615 | * 10/1994 |

OTHER PUBLICATIONS

G. Tricoles, "Computer Generated Holograms: An Historical Review", *Applied Optics*, vol. 26, No. 20, Oct. 15, 1987, XP001032080.

* cited by examiner

*Primary Examiner*—Leonidas Boutsikaris
(74) *Attorney, Agent, or Firm*—Sughrue Mion, PLLC

(57) ABSTRACT

A computer-generated hologram fabrication process which reduces loads on computation of interference fringes for an original image including micro-characters. A visually perceivable original image and a visually unperceivable original image (micro-characters) are defined, and sample point sources of light are defined at a low density on the original image and at a high density on the original image. Interference fringes of object light are found on each computation point within a first area on a recording surface, and interference fringes of object light are found on each computation point within a second area on the recording surface. The light sources that become samples are defined at a given pitch on sectional lines obtained by cutting the original images 11 and 12 by a multiplicity of sections (parallel with an XZ plane) located at a given spacing. The section-to-section spacing for the original image 12 is made narrows than that for the original image 11.

19 Claims, 15 Drawing Sheets

α1 : attribute 1

α2 : attribute 2

α0: non-attribute  α6: attribute 6 (original image126)
α1: attribute 1 (original image121)  α7: attribute 7 (original image127)
α2: attribute 2 (original image122)  α8: attribute 8 (original image128)
α3: attribute 3 (original image123)  α9: attribute 9 (original image129)
α4: attribute 4 (original image124)  α10: attribute 10 (original image110)
α5: attribute 5 (original image125)

α0 : non-attribute
α1 : attribute 1 (original image131)
α2 : attribute 2 (original image132)
α3 : attribute 2 (original image132)
α4 : attribute 3 (original image133)
α5 : attribute 4 (original image110)

FIG. 27

| $\theta(x,y)$ \ $A(x,y)$ | 0~25% | 25~50% | 50~75% | 75~100% |
|---|---|---|---|---|
| $0 \sim \frac{\pi}{2}$ | Refractive index: n1 | Refractive index: n1 | Refractive index: n1 | Refractive index: n1 |
| $\frac{\pi}{2} \sim \pi$ | Refractive index: n2 | Refractive index: n2 | Refractive index: n2 | Refractive index: n2 |
| $\pi \sim \frac{3}{2}\pi$ | Refractive index: n3 | Refractive index: n3 | Refractive index: n3 | Refractive index: n3 |
| $\frac{3}{2}\pi \sim 2\pi$ | Refractive index: n4 | Refractive index: n4 | Refractive index: n4 | Refractive index: n4 |

Amplitude A (horizontal axis), Phase θ (vertical axis)

FIG. 28

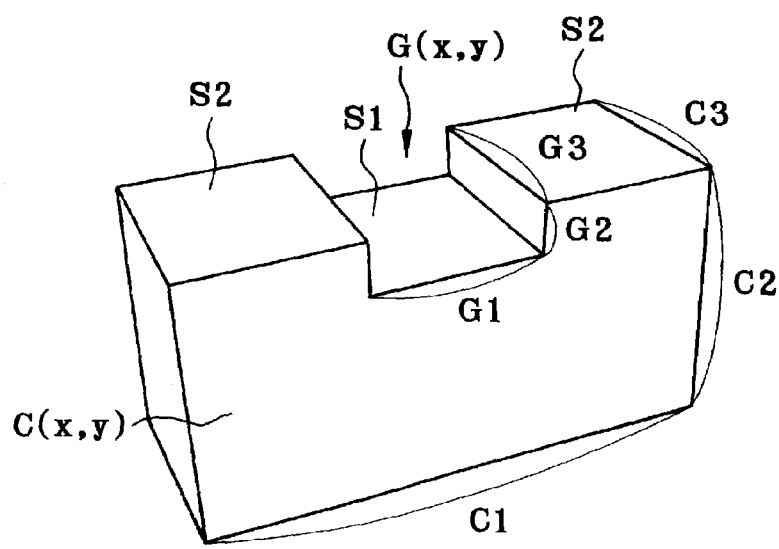

COMPUTER-GENERATED HOLOGRAM FABRICATION PROCESS, AND HOLOGRAM-RECORDED MEDIUM

BACKGROUND OF THE INVENTION

The present invention relates to a hologram-recorded medium and a process for the fabrication of the same, and more particularly to a process for the fabrication of a computer-generated hologram in which an optical pattern is formed on a given recording surface by computer-aided computation and a hologram-recorded medium obtained by the same.

In recent years, coherent light has been easily obtainable by use of lasers, and holograms have been widely commercialized as well. Especially for notes and credit cards, the formation of holograms on portions of their media has become popular for anti-counterfeiting purposes.

Today's commercially available holograms are obtained by recording original images on media in form of interference fringes, using optical techniques. That is, an object that forms an original image is first provided. Then, light from this object and reference light are guided through an optical system such as a lens onto a recording surface with a photosensitive agent coated thereon to form interference fringes on the recording surface. Although this optical technique requires an optical system of some considerable precision for the purpose of obtaining sharp reconstructed images, it is the most straightforward method for obtaining holograms and so becomes most widespread in industry.

On the other hand, techniques for forming interference fringes on a recording surface by computations using a computer for the fabrication of holograms, too, have been known to those skilled in the art. A hologram fabricated by such techniques is generally called a computer-generated hologram (CGH for short) or referred to simply as a computer hologram. This computer hologram is obtained by computer simulation of a process of generation of optical interference fringes, which process is all performed through computer-aided computations. Once image data on an interference fringe pattern have been obtained by such computations, physical interference fringes are formed on an actual medium. A specific technique has already been put to practical use, in which image data on a computer-generated interference fringe pattern are given to an electron beam lithographic system, so that the data are scanned by electron beams on a medium thereby forming physical interference fringes on the medium.

While keeping pace with recent developments of computer graphics, computer-aided processing of various images is being generalized in the printing industry. For the original images to be recorded in holograms, too, it is thus convenient to provide them in the form of image data. In consideration of such demands, techniques for generating computer holograms are of growing importance, and expected to take over optical hologram fabrication methods at some future time.

As already mentioned, micro-characters by printing are now often used as anti-counterfeiting means for notes, credit cards, etc. The micro-characters, because of being little perceivable by the naked eyes, are effective for anti-counterfeiting purposes. However, recent improvements in the performance of copiers enable general printed micro-characters to be copied with some precision. To utilize micro-characters as anti-counterfeiting means, something new is in need.

For practical solutions to such technical challenges, for instance, Utility Model No. 2582847 discloses a method for recording micro-characters having a maximum size of 300 µm or less in the form of a diffraction grating pattern. Such micro-characters recorded as the diffraction grating pattern cannot be copied on current ordinary copiers and so are very effective for prevention of counterfeiting by copiers. It is here understood that such recorded micro-characters of 300 µm or less are authenticated on an enlarged scale under loupes or the like because they cannot visually be perceived. Conversely speaking, the use of loupes, microscopes or the like will enable any person to check the content of authenticating information recorded in the form of micro-characters. Given recently developed, relatively inexpensive, easy-to-obtain devices capable of recording fine diffraction gratings, there is a possibility that the content of authenticating information recorded as micro-characters may be decoded, and counterfeited by a diffraction grating recorder.

Thus, authenticating information recorded by use of diffraction gratings, because of being recorded directly on a recording surface, is vulnerable to copying. On the other hand, the recording of authenticating information in the form of a hologram pattern is superior in view of prevention of counterfeiting, because an interference fringe pattern is simply recorded on a recording surface; the authenticating information itself is not recorded directly on the recording surface. For instance, JP-A 11-21793 discloses an optical hologram fabrication process wherein a real original image comprising characters of normal size is recorded by optical reduction processing as a micro-character hologram pattern.

Of course, it is in principle possible to fabricate such micro-characters using a computer hologram methodology. However, there is still a grave problem with commercialization of computer holograms, that is, excessive computation loads on computers. To obtain reconstructed images of high precision, an original image must be processed as a set of a multiplicity of micro-sources of light. It is then necessary to compute, for each position on a recording surface, the intensity of object light coming from all the micro-sources of light and reference light. To fabricate a computer hologram for an original image such as one comprising micro-characters of visually unperceivable size, computation must be performed with very high precision, imposing some considerable computation loads on the computer used. Although it is prima facie possible to fabricate a computer hologram equivalent in quality to an optical hologram by implementing long-term computation using a super-fast computer having improved computing power, yet such a fabrication process cannot be utilized for commercial purposes. Furthermore, the capacity of image data having information on interference fringe patterns fabricated by computation becomes massive, and operational loads on the formation of interference fringes on a physical recording medium using an electron beam lithographic system becomes massive as well.

SUMMARY OF THE INVENTION

Therefore, one object of the present invention is to provide a process for the fabrication by computation of a computer-generated hologram for an original image comprising a micro-pattern such as a micro-character pattern, wherein computation loads on computers are minimized. Another object of the present invention is to provide a hologram-recorded medium fabricated by such a process.

(1) According to the first embodiment of the invention, there is provided a process of fabricating a computer-generated hologram having interference fringes recorded on a given recording surface by computer-aided computation, which comprises steps of:

defining 2 to K original images, a recording surface for recording the original images, and reference light with which the recording surface is irradiated and which corresponds to said 2 to K original images, and defining a multiplicity of sample light sources on each original image and defining a multiplicity of computation points on the recording surface, whereby for each computation point, the intensity of interference waves formed by object light coming from all or some of the sample light sources and reference light is so found by computation that interference fringes having the thus found intensity distribution are formed on the recording surface as a hologram for the K original images, wherein:

process settings are such that the spatial densities of sample light sources defined on at least two different original images differ from each other.

(2) According to the second embodiment of the invention, there is provided a process of fabricating a computer-generated hologram having an optical pattern formed on a given recording surface by computer-aided computation, which comprises steps of:

defining 2 to K original images, and a recording surface for recording the original images, and defining a multiplicity of sample light sources on each original image and defining a multiplicity of computation points on the recording surface, so that for each computation point, the complex amplitude at a position of said computation point of object light coming from all or some of the sample light sources is computed thereby defining a specific amplitude and a specific phase at each computation point, and locating a physical cell having optical properties consistent with said specific amplitude and said phase in the vicinity of each computation point, so that a hologram recording surface is formed by a set of physical cells, wherein:

process settings are such that the spatial densities of sample light sources defined on at least two different original images differ from each other.

(3) According to the third embodiment of the invention, there is provided a computer-generated hologram fabrication process according to the aforesaid first or second embodiment, wherein the recording surface is divided into a plurality of areas and any one of K attributes is defined in each area, so that with respect to a computation point within an area wherein a k-th attribute (k=1 to K) is defined, the intensity of interference waves or the complex amplitude of object light is calculated with consideration given to only object light emitted from a sample light source for a k-th original image, and information on the k-th original image is recorded within only an area wherein the k-th attribute is defined.

(4) According to the fourth embodiment of the invention, there is provided a computer-generated hologram fabrication process according to the aforesaid third embodiment, wherein a non-attribute is defined in an area where recording of an optical pattern is unnecessary, and any computation is not performed in the area where the non-attribute is defined, so that no optical pattern is formed therein.

(5) According to the fifth embodiment of the invention, there is provided a computer-generated hologram fabrication process as recited in the aforesaid third or fourth embodiment, wherein:

the angle of spreading of object light emitted from each sample light source is limited to a given angle, thereby setting conditions under which object light emitted from a sample light source on a k-th original image reaches only within an area having a k-th attribute, so that the intensity of interference waves or the complex amplitude of object light is computed.

(6) According to the sixth embodiment of the invention, there is provided a computer-generated hologram fabrication process as recited in the aforesaid fifth embodiment, wherein:

the recording surface is located on an XY plane, so that with respect to object light emitted from sample light sources defined as point light sources toward the Z-axis direction, limitation is imposed on the angle of spreading $\theta x$ of object light in the X-axis direction and the angle of spreading $\theta y$ of object light in the Y-axis direction.

(7) According to the seventh embodiment of the invention, there is provided a computer-generated hologram fabrication process as recited in any one of the aforesaid 1st to 6th embodiments, wherein:

a plurality of sections located parallel with one another at a given spacing are defined, and sample light sources arranged at a given spacing on a section line obtained by cutting the surface of the original image by each section are defined, so that the spatial density of the sample light sources is varied by varying a section-to-section spacing for each original image.

(8) According to the eighth embodiment of the invention, there is provided a computer-generated hologram fabrication process as recited in the aforesaid seventh embodiment, wherein:

the recording surface intersects each section with a given line of intersection having a given width to form a strip area, and the intensity of interference fringes or the complex amplitude of object light is computed under such conditions that object light emitted from sample light sources arranged on a sectional line obtained by a j-th section arrives only within a strip area formed by a line of intersection of the j-th section with the recording surface.

(9) According to the ninth embodiment of the invention, there is provided a computer-generated hologram fabrication process as recited in the aforesaid eighth embodiment, wherein:

the width of the strip area is made narrower than the section-to-section spacing, thereby forming on the recording surface a void space wherein any strip area is not defined, said void space being utilized while the results of computation of the interference waves or the complex amplitude of object light with respect to a strip area adjacent thereto are copied thereto.

(10) According to the 10th embodiment of the invention, there is provided a computer-generated hologram fabrication process as recited in any one of the aforesaid 1st to 9th embodiments, wherein:

a first original image of visually perceivable size and a second original image of visually unperceivable size are defined, and the spatial density of sample light sources defined on the second original image is made higher than that the spatial density of sample light sources defined on the first original image.

(11) According to the 11th embodiment of the invention, there is provided a computer-generated hologram fabrication process as recited in the aforesaid 10th embodiment, wherein:

the second original image comprises a character.

(12) According to the 12th embodiment of the invention, there is provided a computer-generated hologram fabrication process as recited in the aforesaid 11th embodiment, wherein:

the character has a maximum size of 300 μm or less.

(13) According to the 13th embodiment of the invention, there is provided a computer-generated hologram fabrication process as recited in any one of the aforesaid 10th to 12th embodiments, wherein:

a plurality of sections located parallel with one another at a given spacing are defined, and sample light sources arranged at a given spacing on a sectional line obtained by cutting the surface of the original image by each section are defined, and for the first original image, sample light sources are defined using sections located at a given spacing of 30 μm or greater, and for the second original image, sample light sources are defined using sections located at a given spacing of less than 30 μm.

(14) According to the 14th embodiment of the invention, there is provided a hologram-recorded medium in which a hologram optical pattern, fabricated by any one of the aforesaid 1st to 13th embodiments is recorded, wherein said hologram optical pattern is recorded on a hologram medium such as a master blank obtained by electron beam lithography, a replica fabricated using the master blank and a medium obtained by forming a reflecting layer on the replica.

(15) According to the 15th embodiment of the invention, there is provided a hologram-recorded medium having a plurality of original images recorded thereon, wherein:

for each original image, information is recorded in separately different recording areas, information carried by object light emitted from a multiplicity of sample light sources defined on the original images to be recorded is recorded in each recording area, and the spatial densities of sample light sources on at least two different original images differ from each other.

(16) According to the 16th embodiment of the invention, there is provided a hologram-recorded medium as recited in the aforesaid 15th embodiment, wherein:

a first original image of visually perceivable size and a second original image of visually unperceivable size are defined, and the spatial density of sample light sources defined on the second original image is made higher than that the spatial density of sample light sources defined on the first original image.

(17) According to the 17 embodiment of the invention, there is provided a hologram-recorded medium as recited in the aforesaid 15th or 16th embodiment, wherein:

a first recording area is recorded with the first original image represented by a group of sample light sources defined on a plurality of planes located parallel with one another at a given spacing of 30 μm or greater, and a second recording area is recorded with the second original image represented by a group of sample light sources defined on a plurality of planes located parallel with one another at a given spacing of less than 30 μm.

(18) According to the 18th embodiment of the invention, there is provided a hologram-recorded medium as recited in the aforesaid 16th or 17th embodiment, wherein:

the second original image comprises a character having a maximum size of 300 μm or less.

(19) According to the 19th embodiment of the invention, there is a provided a hologram-recorded medium having a plurality of original images recorded therein, wherein:

a multiplicity of strip areas of the same rectangular shape are arranged to construct a recording surface, a given optical pattern is recorded within each strip area, and strip areas having the same optical pattern recorded therein are continuously and repetitively located by a given number, and for each original image, information is recorded in separately different recording areas, and the number of continuously located strip areas having the same optical pattern recorded therein differs with respect to at least two recording areas.

Throughout the embodiments of the present invention, the reference light beams corresponding to the 2 to K original images may be all be the same or they may be divided into some groups.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the of the invention will be indicated in the claims.

BRIEF DESCRIPTION OF THE DRAWINGS

FIG. 5(a) represents an original image comprising a visually perceivable 3D image, and FIG. 5(b) an original image comprising visually unperceivable micro-characters.

FIG. 27 is illustrative of variations of a physical cell that may herein be used.

FIG. 28 is a perspective schematic illustrative of one exemplary structure of a physical cell C(x, y) that may herein be used.

DESCRIPTION OF THE PREFERRED EMBODIMENTS

The present invention is now explained specifically with reference to the preferred embodiments shown in the accompanying drawings.

§1. Fundamental Principles of the Invention

Figure 1:
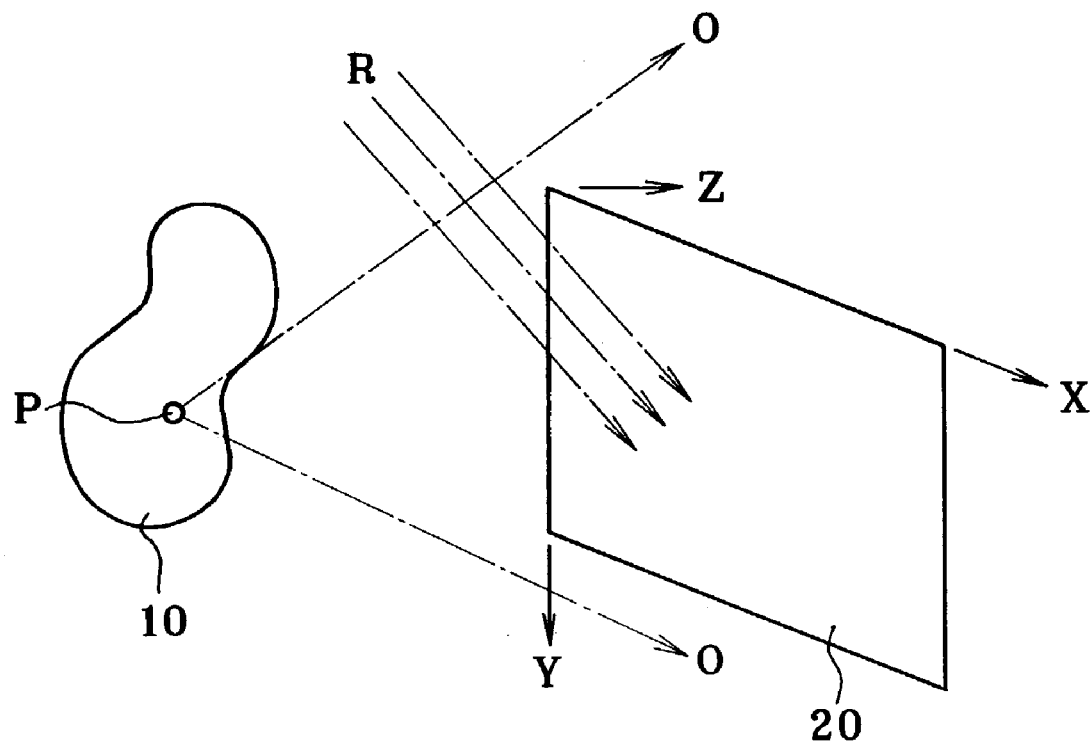
FIG. 1 is illustrative of the principles of a general hologram fabrication process, wherein an original image 10 is recorded as interference fringes on a recording surface 20.

FIG. 1 is illustrative of the principles of how to fabricate a general hologram, showing how to record an original image 10 in the form of interference fringes on a recording surface 20. For convenience of explanation, assume here that the recording surface 20 is placed on an XY plane on the XYZ three-dimensional coordinate system defined as shown in FIG. 1. When the optical technique is used, an actual object or its real or virtual image is provided as the original image 10. Object light O emanating from an arbitrary point P on the original image 10 propagates toward the whole recording surface 20. On the other hand, the recording surface 20 is irradiated with reference light R, so that interference fringes of object light O and reference light R are recorded on the recording surface 20.

Figure 2:
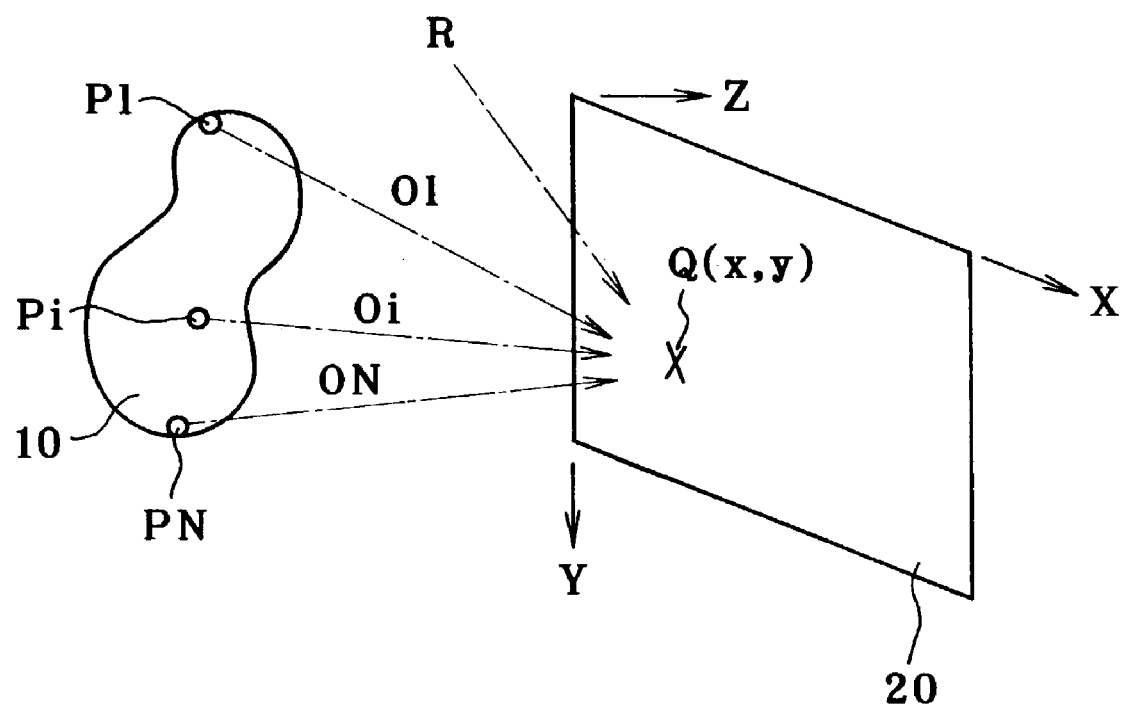
FIG. 2 is illustrative of the principles of a general computer-generated hologram fabrication process, showing how to compute the intensity of interference fringes on a computation point Q(x, y) on a recording surface 20.

To fabricate a computer-generated hologram at the position of the recording surface 20, the original image 10, recording surface 20 and reference light R are each defined in the form of data on a computer, so that the intensity of interference waves at each position on the recording surface 20 can be calculated. Specifically, assume that the original image 10 is processed as a set of N sample light sources P1, P2, P3, . . . , Pi, . . . , PN, as shown in FIG. 2, and that object light beams O1, O2, O3, . . . , Oi, . . . , ON from the respective sample sources propagate toward a computation point Q(x, y) when reference light R is directed toward the computation point Q(x, y). Then, the intensity of amplitude at the computation point Q(x, y) of interference waves created by interference of these N object light beams O1 to ON and reference light R is found by computation. Although point light sources capable of transmitting object light as spherical waves are used as the sample light sources P, it is acceptable to use line sources or minute surface illuminants as the sample light sources. The sample light sources used do not necessarily emit light by themselves, and so may have the property of producing object light by reflection of some illumination light. Usually, the original image 10 is defined as an assembly of many polygons and for each polygon, its direction or reflectivity on a three-dimensional space is defined. Accordingly, given a certain illumination environment, object light may be defined as reflected light from an arbitrary point on the original image 10.

On the other hand, a multiplicity of computation points consistent with the necessary resolution are defined on the recording surface 20, and the intensity of amplitude for each computation point is computed so that the intensity distribution of interference waves is obtained on the recording surface 20. In this embodiment, a matrix array of numerous computation points Q(x, y) are defined on the recording surface 20 at a pitch of 0.6 µm in the X-axis direction and at a pitch of 0.25 µm in the Y-axis direction, and for each computation point the intensity value of amplitude of interference fringes is found. The pitch of computation points defined on the recording surface 20 is not always limited to the aforesaid value; to record interference fringes for obtaining a reconstructed hologram image, however, it is required that a multiplicity of computation points be defined at a fine pitch consistent with the wavelength range of light.

Thus, the intensity distribution of an interference fringe pattern consistent with the resolution of the array of computation points (0.6 µm in the X-axis direction and 0.25 µm in the Y-axis direction in the aforesaid embodiment) is obtained on the recording surface 20, and such an intensity distribution is represented as image date on a two-dimensional plane. If, on the basis of the image data, physical interference fringes (physical light-and-shade or embossed patterns) are formed on a medium, then a computer-generated hologram can be fabricated. To form interference fringes of high resolution on a medium, it is preferable to rely on an electron beam lithographic system that is widely used in applications where mask patterns for semiconductor integrated circuits are written, and functions to perform electron beam scanning with high precision. Therefore, if image data indicative of the intensity distribution of interference waves found by computation are provided to an electron beam lithographic system for electron beam scanning, it is then possible to write an interference fringe pattern consistent with that intensity distribution.

It is here noted that a common electron beam lithographic system has only a function of controlling writing/non-writing, thereby writing a binary image; that is, it is general to subject the intensity distribution found by computation to binary operation and give the resultant binary image data to the electron beam lithographic system. In other words, the given intensity value of amplitude is defined by the aforesaid computation on each computation point Q(x, y). Accordingly, if a given threshold value (e.g., an average of all intensity values of amplitude distributed over the recording surface 20) is set, a pixel value "1" is imparted to a computation point having an intensity value of greater than that threshold value while a pixel value "0" to a computation point having an intensity value of less than that threshold value, and each computation point Q(x, y) is converted to a pixel D(x, y) having a pixel value "1" or "0", then a binary image comprising a set of a multiplicity of pixels D(x, y) is obtained. If the binary image data are given to the electron beam lithographic system for image writing, then the interference fringes can be written in the form of a physical binary image. In actual applications, however, an embossed medium that is a master hologram medium is fabricated on the basis of the thus physically written interference fringes, and embossment is carried out using that embossed hologram medium. In this way, it is possible to mass-fabricate holograms wherein the interference fringes are formed on the surface in the form of a pit-and-projection structure.

By definition, the present invention has been figured out as means for using computation to form an original image comprising micro-characters in the form of a hologram pattern. As already explained, hologram-recorded media having original images of visually unperceivable size recorded therein provide very effective anti-counterfeiting means for notes or credit cards. For practical anti-counterfeiting seals for notes and credit cards, however, it is preferable to record thereon micro-characters of visually unperceivable size along with an original image of visually perceivable normal size, because both authentication by the naked eyes and authentication under loupes, microscopes, etc. are feasible.

Figure 3:
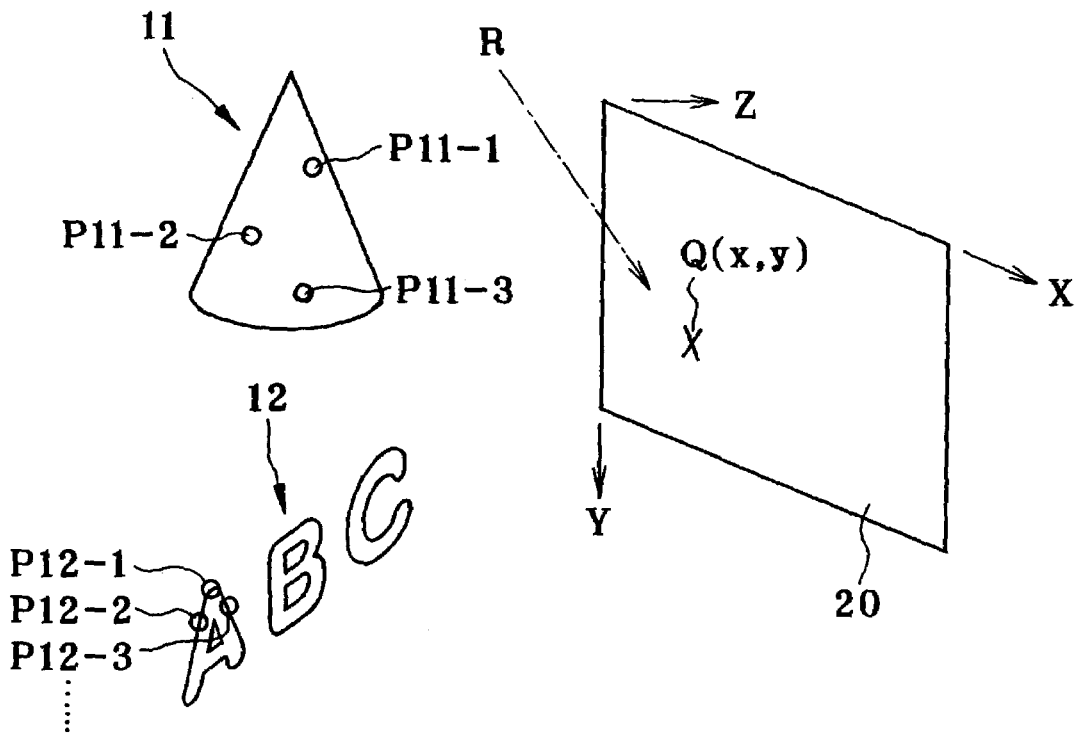
FIG. 3 is illustrative of the principles of recording an original image 11 of visually perceivable normal size and an original image 12 comprising micro-characters of visually unperceivable size on a recording surface 20 using a computer-generated hologram methodology.

FIG. 3 is in principle illustrative of how to record on a recording surface 20 an original image 11 of visually perceivable normal size and an original image 12 comprising micro-characters of visually unperceivable size, using a computer hologram methodology. For convenience of explanation, the original images 11 and 12 are drawn with much the same size. In actual applications, however, both the original images are considerably different from each other. In this embodiment, for instance, the original image 11 is a simple conical 3D image that is about 10 mm in height and of visually fully perceivable size. By contrast, the original image 12 is a plane image comprising three micro-characters "ABC" (instead of which it is acceptable to use a 3D thick image), each having a height of about 200 µm. Generally, micro-characters having a maximum size of 300 µm or less are visually unperceivable, and the characters forming the original image 12 cannot visually be perceived as any significant characters.

Thus, if both the visually viewable original image 11 and the visually unviewable original image 12 are recorded on the recording surface 20 in the form of a hologram pattern, they can then be reconstructed in a 3D image form. It is here noted that although the original image 12 is in itself a set of planar characters, yet it is reconstructed in the form of characters aligned on a three-dimensional space. Accordingly, if such a hologram pattern on the recording surface 20 is formed on a physical recording medium for use as an anti-counterfeiting seal for credit cards or the like, simple authentication can be carried out by visual observation of the original image 11. Whenever necessary, more precise authentication may be carried out by observation of the original image 12 under a loupe or a microscope.

To perform computation for actual fabrication of a computer-generated hologram, a multiplicity of sample light sources must be defined on an original image, as already explained. As the number of sample light sources increases, loads on computation increase cumulatively, and the capacity of data obtained by computation becomes massive as well. For the recording of the original image 12 comprising micro-characters, however, any reconstructed image having adequate resolution cannot be obtained unless sample light sources are defined at a correspondingly high density. The fundamental idea of the present invention is that for each original image, the spatial density of the sample light sources to be defined varies in such a way that the sample light sources are recorded at a high density for an original image (e.g., original image 12) that must be recorded with high resolution, and the sample light sources are recorded at a low density for an original image (e.g., original image 11) that should not be recorded with high resolution. For instance, FIG. 3 shows an arrangement wherein three sample light sources P11-1, P11-2 and P11-3 are defined on the original image 11. Needless to say, much more sample light sources must actually be arranged to record the conical original image 11. On the original image 12, by contrast, sample light sources P12-1, P12-2, . . . are defined at a higher spatial density. For the original image 11 that is a conical image of about 10 mm in height, it is only needed to define sample light sources with the resolution necessary for visual perception of such a 3D image pattern. For the original image 12 that comprises micro-characters having a maximum size of about 200 µm, however, it is necessary to define sample light sources with resolution high enough for visual perception of fine shape information upon observation under magnifying means such as a loupe.

The fundamental steps of the computer-generated hologram fabrication process according to the invention are much the same as those of a conventional computer-generated hologram fabrication process. Referring specifically to the embodiment shown in FIG. 3, data indicative of a plurality of original images 11 and 12 are prepared, a multiplicity of sample light sources are defined on each original image 11, 12, a recording surface 20 is defined, a multiplicity of computation points Q(x, y) are defined on the recording surface 20, and reference light R is defined to irradiate the recording surface 20 therewith. Then, for each computation point Q(x, y), the intensity of interference fringes formed by object light emanating from the sample light sources and the reference light R is found by computation, so that interference fringes having the thus found intensity distribution are formed on the recording surface 20. Here the present invention is characterized in that when sample light sources are defined on a plurality of original images 11 and 12, their spatial density is varied for each original image. While this embodiment has been described with reference to two original images 11 and 12, it is understood that the same holds true for an arrangement where three or more original images are used. The present invention is summarized as follows: When 2 to K original images are recorded on a single recording surface 20, the spatial densities of the sample light sources defined on at least two different original images should be set in such a way as to differ from each other.

The rudimentary principles of a hologram are that "information on one arbitrary point on an original image is recorded all over a recording surface". By the recording of information on the original image on the basis of those principles, a 3D image is obtained upon reconstruction. Referring to the embodiment shown in FIG. 3 as an example, information carried by object light coming from the sample light source P11-1 defined as a point light source on the original image 11 is recorded as the intensity of interference waves at all computation points on the recording surface 20. Likewise, information carried by object light leaving the sample light source P12-1 defined as a point light source on the original image 12, too, is recorded as the intensity of interference fringes at all computation points on the recording surface 20. When the computer-generated hologram methodology is relied on, however, some deviations from the aforesaid rudimentary principles may optionally be permissible. By setting a variety of computation conditions, it is thus possible to record original images according to a process slightly deviating from those rudimentary principles.

Figure 4:
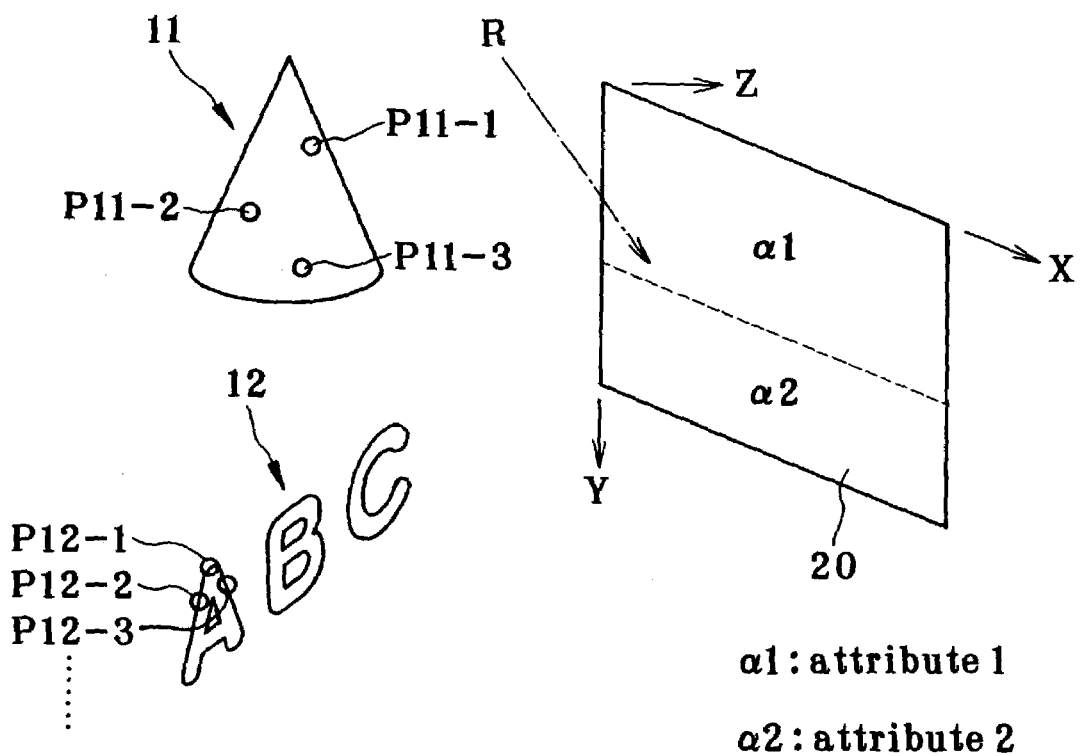
FIG. 4 is illustrative of the principles of dividing a recording surface into separate areas to record original images 11 and 12 that differ for each area.

As shown typically in FIG. 4, a recording surface 20 may be divided into an upper area α1 and a lower area α2 in such a way that only information about an original image 11 is recorded in the upper area α1, and only information about an original image 12 is recorded in the lower area α2. More specifically, when computing the intensity of interference fringes on computation points within the upper area α1, the computation should be performed with consideration given to only object light from sample light sources on the original image 11, and when computing the intensity of interference fringes on computation points within the lower area α2, the computation should be performed with consideration given to only object light from sample light sources on the original image 12.

Thus, when a recording process deviating from the rudimentary principles of a hologram that "information on one arbitrary point on an original image is recorded all over a recording surface" is relied on, any complete 3D image cannot be reconstructed from the hologram pattern obtained on the recording surface 20. For instance, the field angle becomes narrow upon observation, so that when the recording surface 20 is observed at an acute angle from above or below, the two images 11 and 12 cannot correctly be reconstructed. In practical applications, however, this does not offer a grave problem because for the purpose of fabricating a hologram-recorded medium used for anti-counterfeiting, it is not always required to obtain complete 3D images upon reconstruction.

If, as is the case with FIG. 4, the process wherein the recording surface 20 is divided into a plurality of areas α1 and α2 in such a way that only information about the first original image 11 is recorded in the upper area α1 and only information about the second original image 12 in the lower area α2 is used, then a great deal of loads on computation can be lifted up. That is, for computation on computation points within the upper area α1, it is unnecessary to take object light from sample light sources on the original image 12 into consideration, and for computation on computation points within the lower area α2, it is unnecessary to take object light from sample light sources on the original image 11 into account. Besides, in the present invention the spatial density of sample light sources on the original image 11 is different from the spatial density of sample light sources on the original image 12. Accordingly, if, as is the case with FIG. 4, information is recorded on a separate area for each original image, it is then possible to perform computation while sample light sources are uniformly defined, so that loads on computation can be further relieved. For instance, unless the recording surface is divided as is the case with FIG. 3, it is then impossible to perform computation on an arbitrary computation point Q(x, y) while sample light sources are uniformly defined. If, as is the case with FIG. 4, the recording surface is divided, it is then possible to perform processing in such a way that when computation is performed on computation points within the upper area α1, sample light sources are defined at a uniform pitch β1, and when computation is performed on computation points within the lower area α2, sample light sources are defined at a uniform pitch β2.

In short, when 2 to K original images are recorded on a recording surface according to the present invention, it is preferable to divide the recording surface into a plurality of areas and define one attribute out of K attributes for each area, so that on computation points within an area wherein a k-th (k=1 to K) attribute is defined, the intensity of interference fringes is computed while only object light emanating from sample light sources on a k-th original image is taken into consideration, whereby information on the k-th original image can be recorded within the area wherein the k-th attribute is defined. Referring to the embodiment of FIG. 4, an attribute 1 is defined in the upper area α1 so that information about the first original image 11 is recorded therein, and an attribute 2 is defined in the lower area α2 so that information about the second original image 12 is recorded therein.

§2. More Specific Embodiments

Figure 5A:
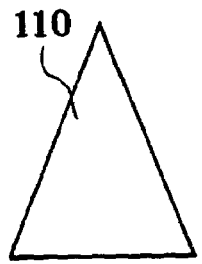
FIGS. 5(a) and 5(b) are front views of original images used for more specific embodiments of the invention.
Figure 6:
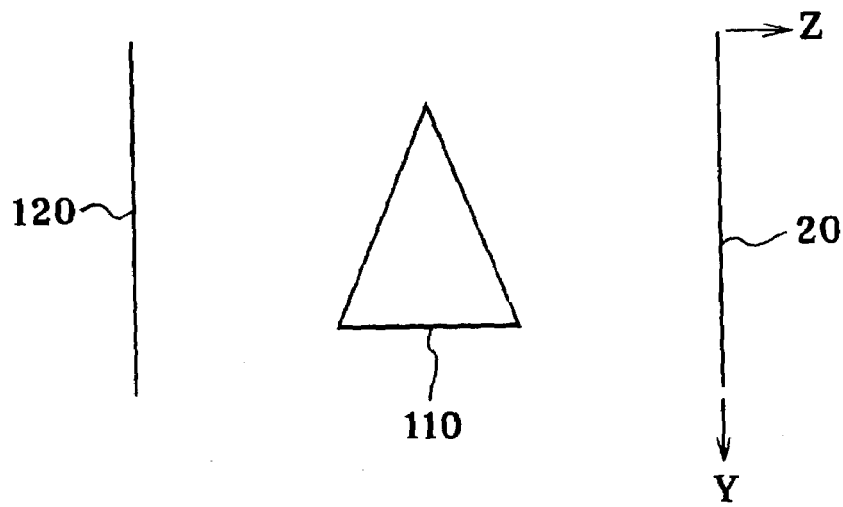
FIG. 6 is a side view of in what state the original images depicted in FIGS. 5(a) and 5(b) are located in the rear of a recording surface 20.

The present invention is now explained with reference to more specific embodiments. Consider here the case where an original image 110 having such conical shape as depicted in FIG. 5(a) and nine original images 121–129 defined on an image plane 120 are recorded on the same recording surface 20. The original image 110 used herein is a visually perceivable 3D image of about 10 mm in height, as is the case with the aforesaid original image 11, and the original images 121–129 are each a plane image comprising visually unperceivable micro-characters of about 200 μm in height, as is the case with the aforesaid original image 12. Then, as shown in FIG. 6, the recording surface 20 is located on an XY plane (with the X-axis being vertical to the paper), the original image 110 is placed in the rear of the recording surface 20 (in the left-hand direction of the paper), and the image plane 120 with the original images 121–129 formed thereon is placed in a further rear thereof.

Figure 5B:
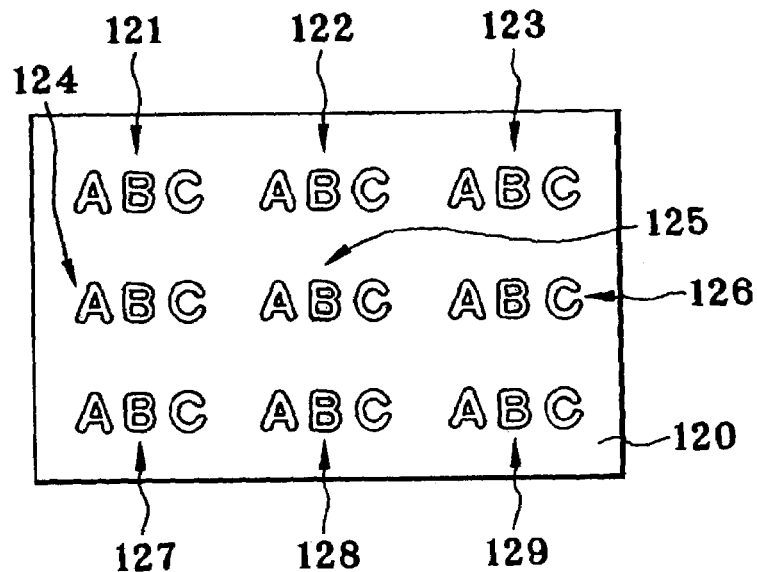
Figure 7:
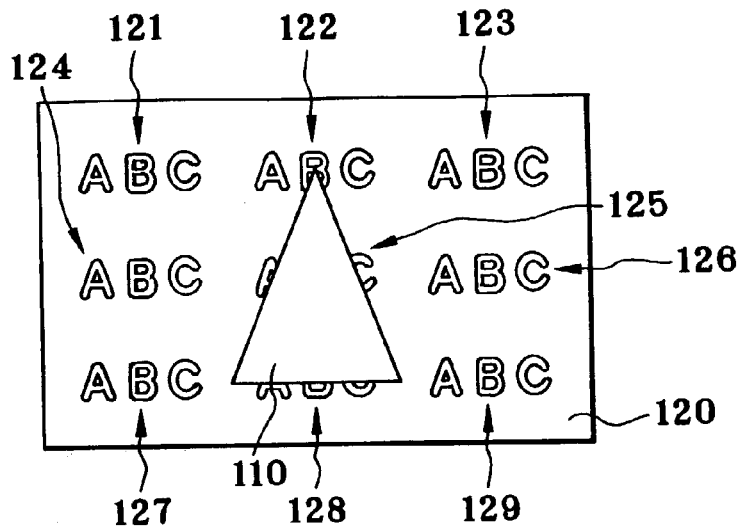
FIG. 7 is a front view of the original images of how the original images shown in FIG. 5 is observed as viewed from the side of the recording surface 20.

FIG. 7 is a front view of these original images as viewed from the recording surface 20 side. The conical original image 110 is located in front of the image plane 120, and the original images 121–129 formed on the image plane 120 and comprising micro-characters have a so-called background function in terms of design. When such original images that have been recorded on the recording surface 20 are reconstructed, the respective original images are observed in the same state as in FIG. 7. Of course, the reconstructed image to be observed is a hologram reconstructed image having a depth on a three-dimensional space, so that although depending on the angle of viewing, there is a change in the location of the original image 110 relative to the original images 121–129 that form the background. For convenience of explanation, the original images 121–129 are each shown in the form of a perceivable character string in FIGS. 5 and 7; in practical applications, however, such characters are visually unperceivable micro-characters or they are visually only observed in the form of a striped pattern.

Figure 8:
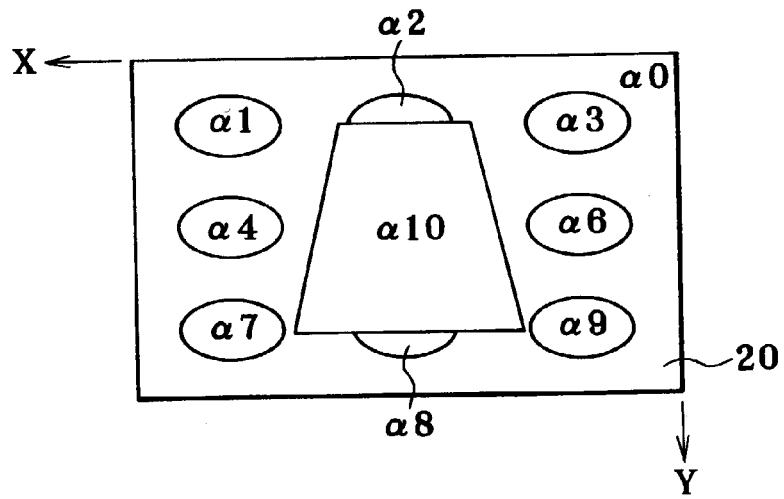
FIG. 8 is a front view illustrative of areas defined on the recording surface 20 for the purpose of recording the original images of FIG. 7 thereon.

In the embodiment considered here, ten sets of original images 110 and 121–129 in all are recorded on the recording surface 20. For this reason, ten areas $\alpha 1$ to $\alpha 10$ are defined on the recording surface 20 as shown in FIG. 8, and any one of attributes 1 to 10 is defined in each area. It is noted that in an area $\alpha 0$ in FIG. 8 (which is located outside of the ten areas $\alpha 1$ to $\alpha 10$), there is no need of recording interference fringes or a non-attribute is defined. The attributes 1 to 10 are parameters indicative of the original images 121–129 and 110, respectively; the area al having attribute 1 allocated thereto is recorded with original image 121, the area $\alpha 2$ having attribute 2 allocated thereto is recorded with original image 122, . . . , the area $\alpha 9$ having attribute 9 allocated thereto is recorded with original image 129, and the area $\alpha 10$ having attribute 10 allocated thereto is recorded with original image 110. It is noted that the area $\alpha 5$ having attribute 5 allocated thereto does not practically exist because it is hidden behind the area $\alpha 10$.

According to the computer-generated hologram fabrication process of the present invention, ten original images 110 and 121–129 are defined as shown in FIG. 7, and then ten recording areas $\alpha 1$–$\alpha 10$ are defined on the recording surface 20. Subsequently, a number of sample light sources are defined on each original image at a given spatial density. At this time, sample light sources are defined at a low density for original image 110 because of being of visually perceivable size, and at a high density for each of original images 121–129 because of being of visually unperceivable size. Then, given reference light R is defined for the recording surface 20 and a multiplicity of computation points are defined on the recording surface 20. For each computation point, the intensity of interference waves of object light emitted from each original image and reference light is computed. However, it is noted that when performing computation on each computation point, it is required to take into consideration only the object light coming from a sample point on the original image indicated by the attribute that the area to which said computation point is allocated has.

For instance, on computation points in the area $\alpha 1$, computations are implemented while only the object light coming from a sample light source on the original image 121 indicated by attribute 1 is taken into account, and on computation points in the area $\alpha 10$, computations are implemented while only the object light coming from a sample light source on the original image 110 indicated by attribute 10 is taken into consideration. Thus, although computations must be performed for a multiplicity of sample light sources defined at high densities on computation points in the areas $\alpha 1$–$\alpha 9$, only computations for sample light sources defined at low densities are needed on computation points in the area $\alpha 10$, so that the total amount of computations can be minimized. It is noted that with respect to the area $\alpha 0$, any computation of the intensity of interference waves does not take place in itself.

Thus, a given interference fringe pattern is determined for each of areas $\alpha 1$–$\alpha 10$. Strict speaking, a computer-generated hologram formed by defining areas $\alpha 1$–$\alpha 10$ on the recording surface in such a way that only information about one original image is recorded for each area is not an intrinsic hologram, as also referred to in §1. That is, the rudimental principles of a hologram are that "information on one arbitrary point on an original image is recorded all over a recording surface". With a hologram that is fabricated by recording only information on a specific original image for each individual area, it is thus impossible to reconstruct any desired 3D image. To be more specific, the field angle for viewing becomes narrow, and so when the recording surface 20 is viewed from an oblique direction, it is impossible to reconstruct any right image. As already mentioned, however, even such a hologram has no practically grave problem because of functioning well as an anti-counterfeiting mark for credit cards or notes.

As can be seen from a comparison between FIG. 8 and FIG. 7, the locations and configurations of the areas $\alpha 1$–$\alpha 10$ defined on the recording surface 20 are approximate to those of the original images 121–129 and 110 shown in FIG. 7. Thus, it is practically preferable that the location and configuration of each area are defined on the recording surface 20 in such a way as to approximate to those of each original image projected onto the recording surface 20. This is because the spatial location of each reconstructed image must be observed in similar relations as in the spatial location of each original image. The area $\alpha 0$ to which the non-attribute is allocated takes no part in the formation of the reconstructed image because there is no recorded interference fringe pattern.

Figure 9:
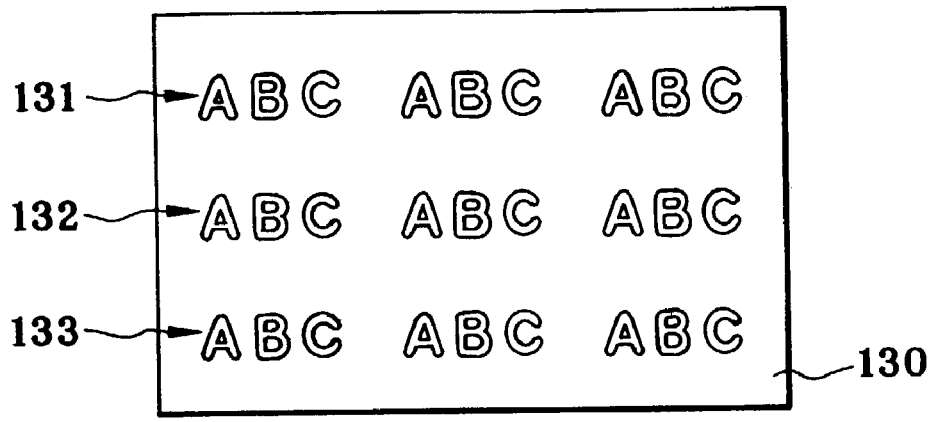
FIG. 9 is a front view where the original images shown in FIG. 5 are represented in a separate group unit.

In the aforesaid embodiment, the character string "ABC" is thought of as one original image, and the embodiment shown in FIG. 7 is described with reference to a total of 10 original images 110 and 121–129. However, the "one original image" used herein is an arbitrary definition; one single character may be thought of as one original image, and a character string group comprising a number of character strings may be regarded as one original image. For instance, FIG. 9 shows one example where character strings of ABC are arranged in three rows and three columns are thought of as one original image. This example may be dealt with on assumption that three original images 131, 132 and 133 are provided on an image plane 130.

Figure 10:
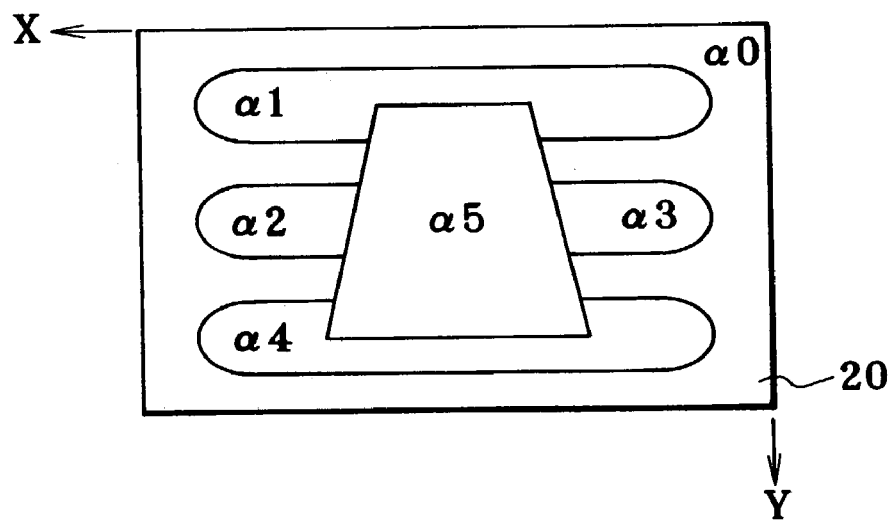
FIG. 10 is a front view illustrative of areas defined on a recording surface 20 corresponding to the group unit shown in FIG. 9.

FIG. 10 is illustrative of one example of an area definition corresponding to FIG. 9, wherein five areas $\alpha 1$–$\alpha 5$ are defined on a recording surface 20 with an area a0 having a non-attribute. An attribute 1 is allocated to area $\alpha 1$ with information about the first original image 131 recorded therein. An attribute 2 is allocated to areas $\alpha 2$ and $\alpha 3$ with information on the second original image 132 recorded therein, an attribute 3 is allocated to area $\alpha 4$ with information about the third original image 133 recorded therein, and an attribute 4 is allocated to area $\alpha 5$ with information about the fourth original image 110 recorded therein. A merit of the hologram obtained by the area definition shown in FIG. 10 over that obtained by the area definition shown in FIG. 8 is that the field angle with respect to the horizontal direction (the X-axis direction) becomes wide. For instance, the area $\alpha 1$ of FIG. 10 is recorded with the original image 131 depicted in FIG. 9, i.e., information consisting of three sets of "ABC" character strings arranged in the horizontal direction; even when they are observed in an oblique right-hand or left-hand direction, the intended 3D reconstructed image may be obtained. However, the amount of computations on all computation points within this area a1 increases unavoidably, because object light coming from all sample light sources on the original image 131 must be taken into consideration.

In the present invention, which portion of all the objects to be recorded is thought of as "one original image" is an arbitrarily determinable matter. For instance, it is thus possible to define sample light sources at a high density while a hair portion of a human face is selected as the first original image from its original images and define sample light sources at a low density while the rest is selected as the second original image.

§3. Specific Definition of Areas and Sample Light Sources

In the aforesaid embodiments, the recording surface 20 is divided into a plurality of areas as shown in FIG. 8 or FIG. 10, and any one of K attributes or a non-attribute is defined for each area, so that on computation points within an area to which a k-th attribute (k=1 to K) is allocated, the intensity of interference waves is computed while only object light emitted from a sample light source for a k-th original image is taken into consideration. How to specifically define areas on the recording surface 20 is now explained.

As already explained in §2. EMBODIMENT, it is preferable that the areas on the recording surface 20 are defined in conformity with the locations and configurations of the original images. For instance, the areas α1–α10 depicted in FIG. 8 are located and configured in conformity with the original images 121–129 and 110 shown in FIG. 7. Practically, such area definition can easily be achieved by limiting to a given angle the angle of spreading of object light emitted from individual sample light sources defined on the original images. By such limitation to the angle of spreading, it is possible to determine a specific condition that enables object light emitted from a sample light source on a k-th original image to reach only within an area having a k-th attribute.

Figure 11:
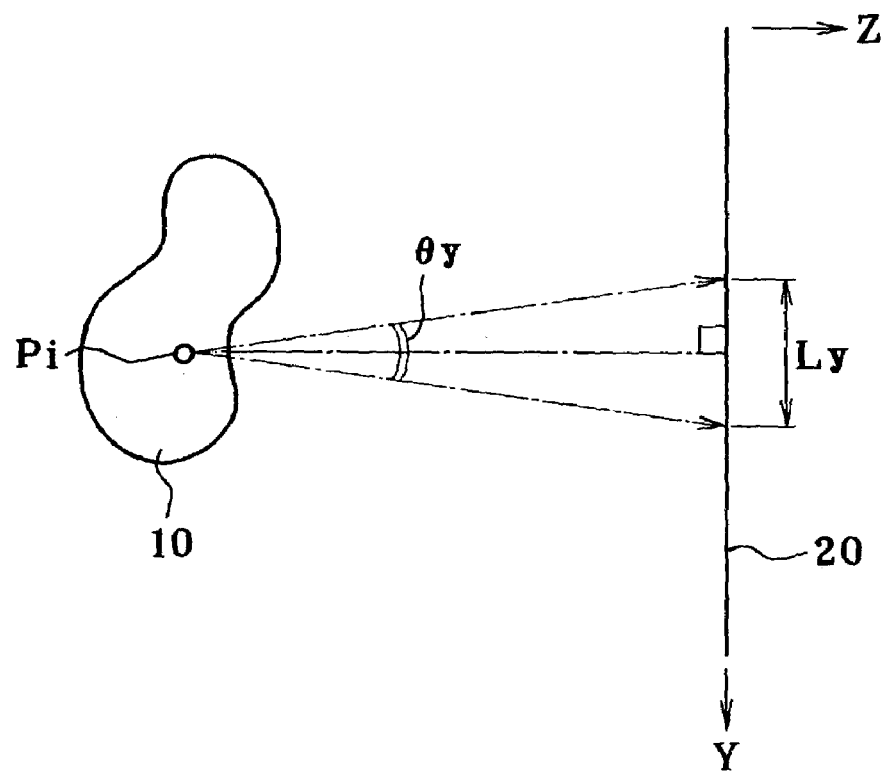
FIG. 11 is a side view illustrative of the principles of limiting the angle of spreading of object light emitted from a sample light source Pi on an original image 10.
Figure 12:
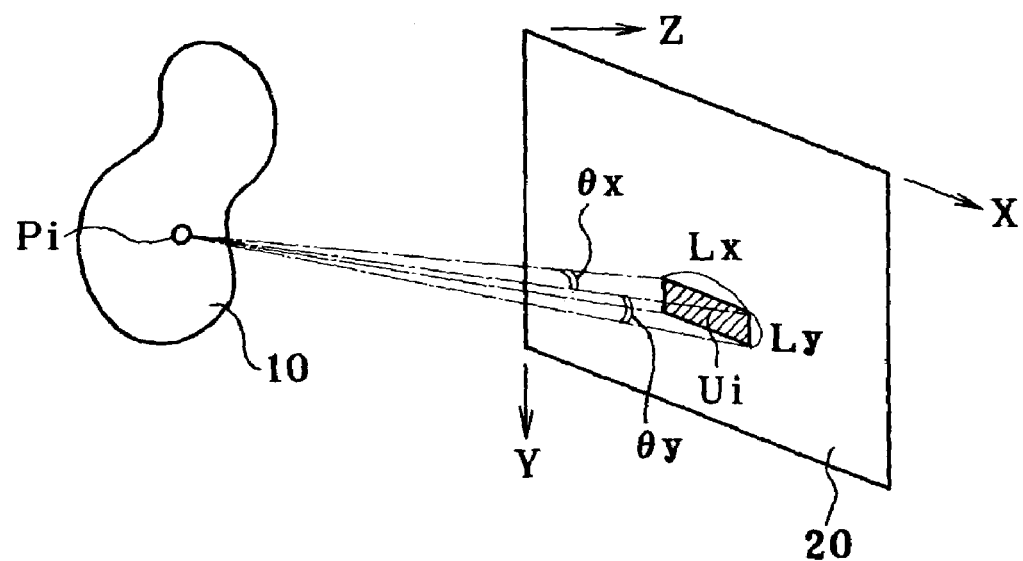
FIG. 12 is a perspective view illustrative of the principles of limiting the angle of spreading of object light emitted from the sample light source Pi on the original image 10.

For instance, consider now the case where a recording surface 20 is defined on an XY plane (with the X-axis being in a direction vertical to the paper) and information about an original image 10 located in the rear thereof (in the left-hand direction) is recorded on the recording surface 20, as shown in FIG. 11. Suppose in this case that an i-th sample light source Pi defined on the original image 10 were a point light source. Object light emitted from this sample light source Pi, by definition, will take the form of spherical waves arriving at the whole recording surface 20. However, if the angle of spreading in the Y-axis direction of object light emitted from the sample light source Pi is limited to an angle θy with the center on a perpendicular (parallel with the Z-axis) to the recording surface 20 as shown in FIG. 11, the object light coming from the sample light source Pi will arrive at only a portion Ly of the width of the recording surface 20. Likewise, if the angle of spreading of the object light in the X-axis direction is limited to an angle θx, the object light coming from the sample light source Pi will arrive at only a portion of unit area Ui on the recording surface 20, as shown in FIG. 12. The unit area Ui in this case becomes a rectangular area wherein the lengths in the X-axis and Y-axis directions are given by Lx and Ly, respectively, as hatched in FIG. 12.

Thus, if specific limitations are imposed on the angles of spreading, θx and θy in the X-axis and Y-axis directions, of object light emitted from each sample light source defined as a point light source with the recording surface 20 located on the XY plane, then the rectangular area whose lengths in the X-axis and Y-axis directions are given by Lx and Ly, respectively, is defined as an area at which object light emitted from an individual sample light source arrives. Accordingly, if the same technique is used to limit the angles of spreading of object light coming from all of N sample light sources defined on the original image 10, then information about the original image 10 is recorded only within a specific area comprising a set of all of N rectangular areas (that overlap one another) defined on the recording surface 20. Thus, if the specific limiting condition is set for the angle of spreading of object light emitted from each sample light source on the original image, the area on the recording surface 20 is uniquely defined.

Another matter that must be defined for carrying out the present invention is the position of a sample light source, for which any one of point, linear and surface light sources may be used. However, the present invention is here explained with only embodiments using point light sources. When point light sources are used as all sample light sources, only the determination of information about their positions on the original image is needed for the definition of the sample light sources. It is here noted that the intensity of object light is determined depending on the luminance, reflectivity, etc. of the original image at the positions of sample light sources. How to define the positions of sample light sources is now explained, utilizing a plurality of mutually parallel sections.

Figure 13:
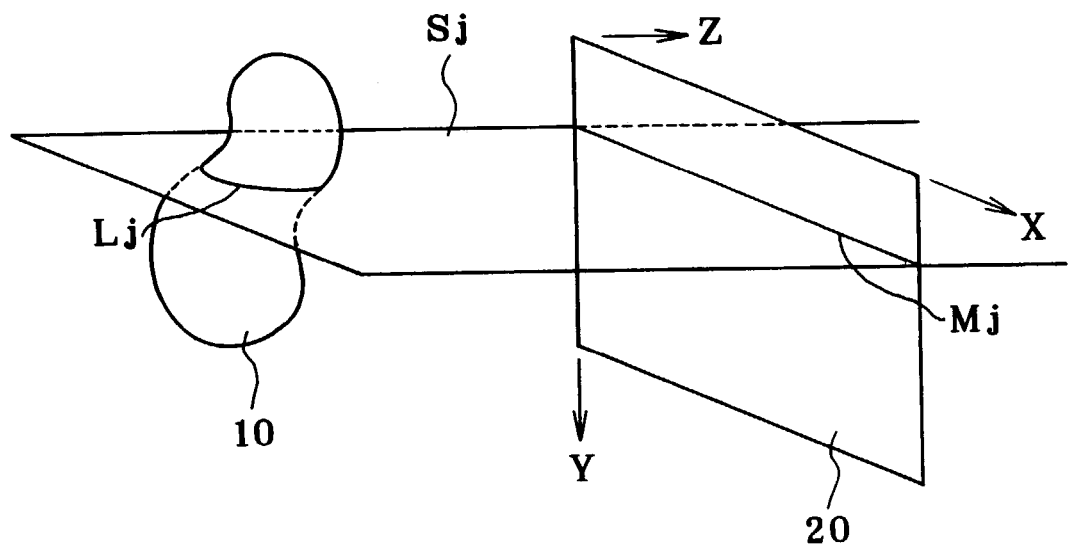
FIG. 13 is a perspective view of in what state an original image 10 and a recording surface 20 are cut along a section.

Consider now a plurality of sections, along which both an original image 10 and a recording surface 20 positioned on an XY plane, both located as shown in FIG. 13, are cut. Imagine here that each section is parallel with the XZ plane. A section Sj shown in FIG. 13 represents a j-th section of the plurality of sections. By cutting the surface of the original image 10 by the j-th section Sj, a j-th sectional line Lj is defined as shown in FIG. 13, and by cutting the recording surface 20 by the j-th section Sj, a j-th sectional line Mj is defined as shown in FIG. 13. Here the sectional line Mj formed on the recording surface 20 side is called a line of intersection Mj. Once the sectional line Lj has been defined on the original image 10 side in this way, a multiplicity of sample (point) light sources should be defined on the sectional line Lj at a given spacing.

Figure 14:
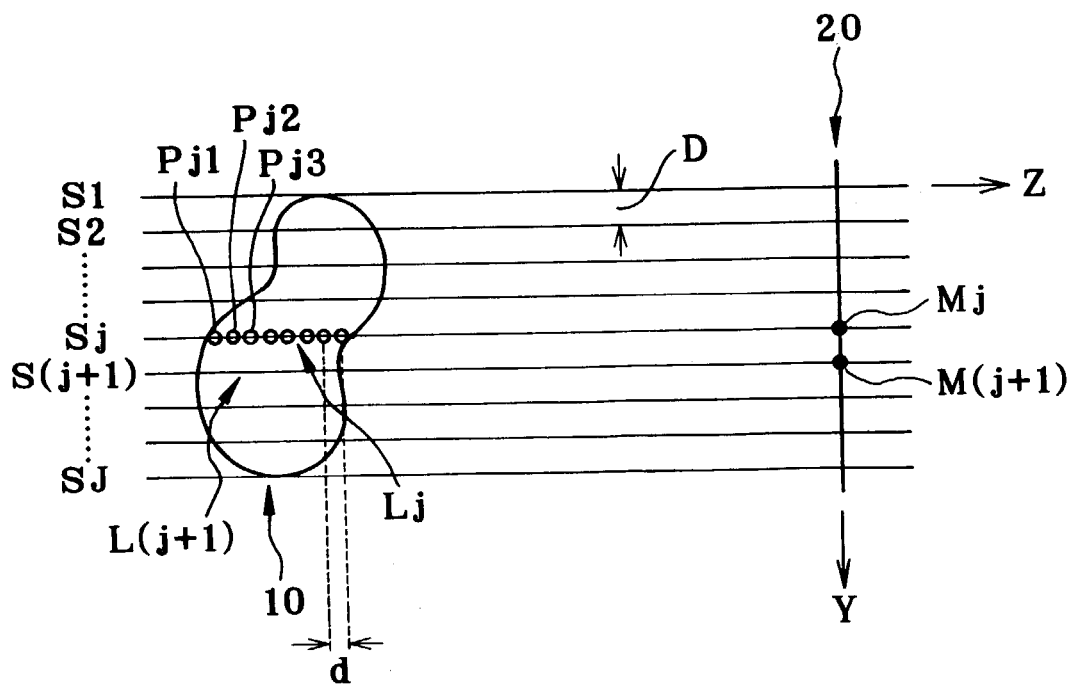
FIG. 14 is a side view illustrative of how to define a multiplicity of sample light sources on the surface of the original image 10.

FIG. 14 is a side view illustrative of how a multiplicity of sample light sources are defined on the surface of an original image 10. As shown, a total of J sections S1–SJ (that are all parallel with the XZ plane) are defined while adjacent sections are spaced away from each other at a given spacing D. If J sections S1–SJ are defined in this way, J sectional lines L1–LJ are defined on the original image 10 side at a given spacing D and J lines of intersection M1–MJ (vertical to the paper) are defined on the recording surface 20 side at a given spacing D. If sample light sources are defined on each of sectional lines L1–LJ at a given spacing d (that may be either a straight line spacing or an spacing of distance along each section), then it is possible to regularly define a multiplicity of sample light sources on the surface of the original image 10. As shown typically in FIG. 14, sample light sources Pj1, Pj2, Pj3, are defined on a j-th sectional line Lj. Y-coordinate values for these sample light sources Pj1, Pj2, Pj3, . . . coincide with the Y-coordinate value for a j-th line of intersection Mj on the recording surface 20 side. At a position that goes down from a sectional line Lj by the given spacing D, a (j+1)-th sectional line L(j+1) formed by a (j+1)-th section S(j+1) is defined, and a multiplicity of sample light sources (not shown) are defined on this sectional line L(j+1) at a given spacing d. The Y-coordinate values for these sample light sources coincide with the Y-coordinate value for a (j+1)-th line of intersection M(j+1).

The feature of the present invention is that the spatial density of sample light sources is varied for each original image. However, if sample light sources are defined utilizing sections as explained above, it is then possible to vary the section-to-section spacing D or the spacing d between the sample light sources located on the sectional line, thereby varying the spatial density of the sample light sources. Preferably in practical applications, both the intervals d and D should be varied in association with each other (otherwise, there may possibly be a case where the longitudinal resolution of a reconstructed image differs extremely from the lateral resolution thereof), because the section-to-section spacing D is a determinative factor for the longitudinal density of sample light sources and the spacing d between the sample light sources is a determinative factor for the lateral density of sample light sources. In this embodiment, therefore, a specific condition is set in such a way as to ensure that d is constantly equal to D/2; once the section-to-section spacing D has been determined, the spacing d between the sample light sources located on the sectional line can automatically be determined.

Thus, a plurality of sections located in such a way that they are kept parallel with each other at the given spacing D are defined, and sample light sources arranged at the given spacing d on the sectional line obtained by cutting the surface of the original image 10 by each sectional line are defined. By doing so, it is then possible to easily define a multiplicity of sample light sources regularly located on the original image 10. Furthermore, the section-to-section spacing D can be varied for each original image, so that the spatial density of sample light sources can easily be varied. Referring here to practical values for the section-to-section spacing D, it is preferable that 30 μm or greater (e.g., 80 μm) is used for a visually perceivable original image (at less than 30 μm, the resolution becomes higher required, ending up with useless computations), and 30 μm or less (e.g., 20 μm) is used for a visually unperceivable original image (e.g., micro-characters of 100 μm in height and 50 μm in width) (at 30 μm or greater micro-characters, etc. cannot be represented with adequate resolution). As described above, the spacing d between the sample light sources located on the sectional line may be set in such a way that d=D/2 for instance.

Figure 15:
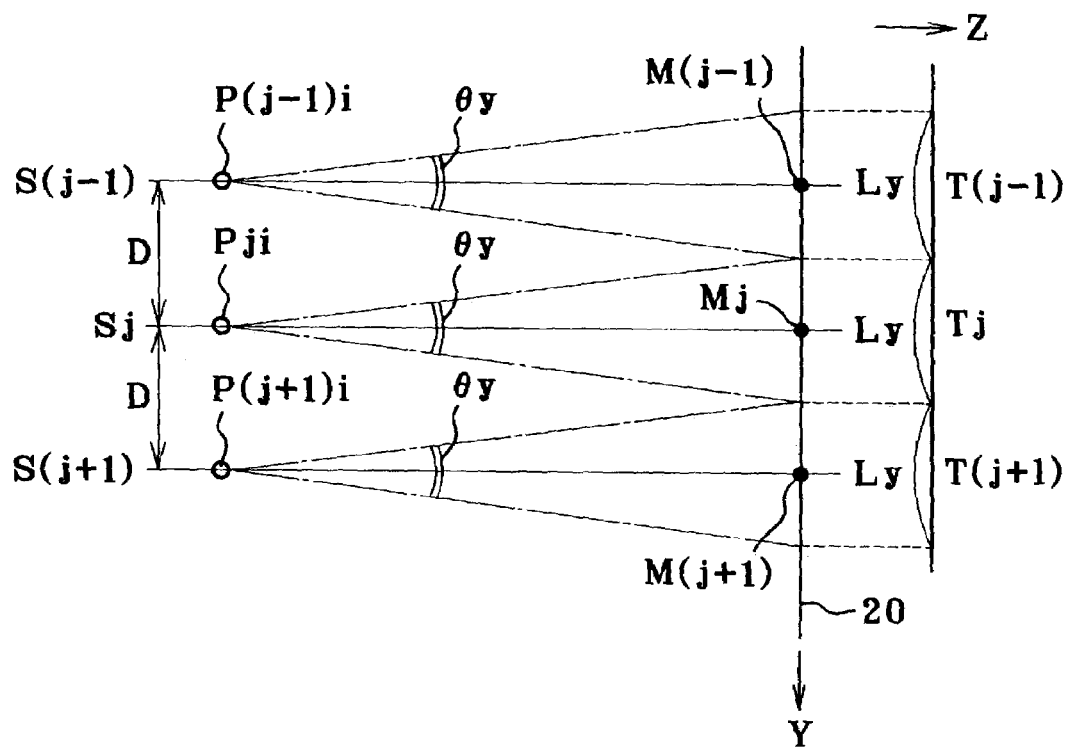
FIG. 15 is a side view illustrative of how to set the angle of spreading, showing only a portion of FIG. 14 on an enlarged scale.

Next, reference is made to a specific embodiment of the present invention wherein, as shown in FIG. 14, sample light sources comprising point light sources are defined utilizing a plurality of sections, and the angles of spreading of object light emitted from individual sample light sources are limited, so that the intensity of interference waves is computed on each computation point on a recording surface 20. FIG. 15 is a side view of how to set the angles of spreading, showing a portion of FIG. 14 on an enlarged scale. An i-th sample light source P(j−1)i defined on a sectional line by a(j−1)-th section S(j−1), an i-th sample light source Pji defined on a sectional line by a j-th section Sj, and an i-th sample light source P(j+1)i defined on a sectional line by a (j+1)-th section S(j+1) are shown as typical sample light sources. Shown by black circles (each taking the form of a line extending vertically to the paper), on the other hand, are a line of intersection M(j−1) with the (j−1)-th section S(j−1), a line of intersection Mj with the j-th section Sj and a line of intersection M(j+1) with the (j+1)-th section S(j+1).

Here, strip areas T(j−i), Tj and T(j+1) are defined by allowing the lines of intersection M(j−1), Mj and M(j+1) to have widths Ly in the Y-axis direction. Specifically, each strip area is in a rectangular form, which is slender in the lateral (X-axis) direction, and whose width in the Y-axis direction is given by Ly and whose width in the X-axis direction is given by the lateral width of the recording surface 20 with the center line defined by each line of intersection. For convenience of explanation, the recording surface 20 is shown on the right-hand side of FIG. 15; in practical applications, however, each strip area is given by a rectangular area defined on the recording surface 20. Here, if the width Ly of each strip area is made equal to the section-to-section spacing D, the recording surface 20 is thoroughly filled up with a number of strip areas, as shown. Then, if the angle of spreading, θy, in the Y-axis direction of object light emitted from each sample light source is set in such a way that the area irradiated with the object light comes within one strip area, for instance, object light from the sample light source P(j−1)i reaches only within the strip area T(j−1), object light from the sample light source Pji reaches only within the strip area Tj, and object light from the sample light source P(j+1)i reaches only within the strip area T(j+1).

Figure 16:
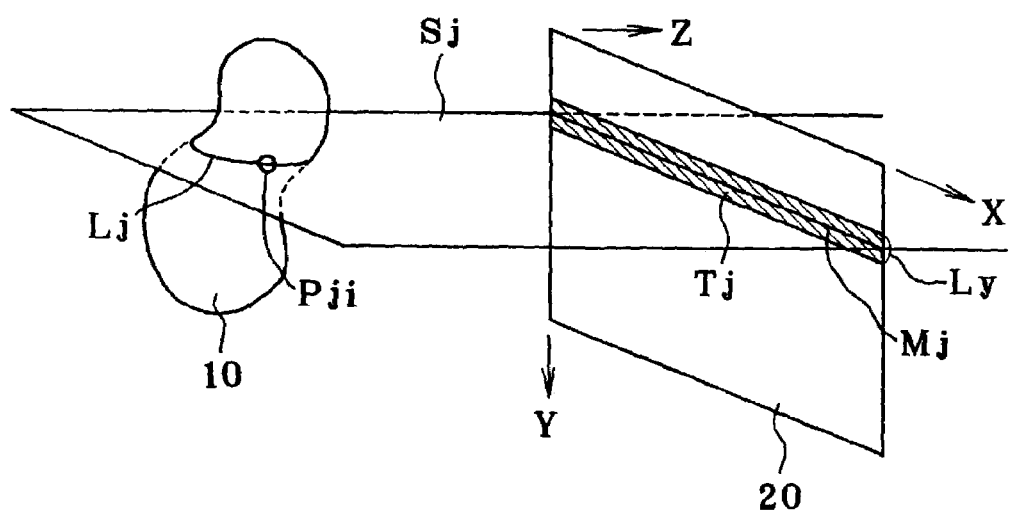
FIG. 16 is a perspective schematic illustrative of the relationships between a sample light source defined on an original image 10 and a strip area defined on a recording surface 20.

FIG. 16 is a perspective schematic illustrative of what relation a sample light source Pji defined on an original image 10 has to a strip area Tj defined on a recording surface 20. Here, a sample light source Pji is an i-th sample light source out of a multiplicity of sample light sources located at a given spacing d on a jth sectional line Lj defined by cutting the original image 10 by a j-th section Sj. The strip area Tj is a rectangular area (hatched in FIG. 16) defined by allowing a line of intersection Mj of the j-th section Sj with the recording surface 20 to have a width Ly (Ly=D) in the Y-axis direction. Here, if the angle of spreading of object light emitted from the sample light source Pji in the Y-axis direction is limited to a given angle θy, this object light will reach only within the strip area Tj. Although not shown in FIG. 16, a multiplicity of sample light sources inclusive of the sample light source Pji are defined on the sectional line Lj. Here, if a specific condition is set in such a way that object light beams emitted from all sample light sources defined on the sectional line Lj reach only within the strip area Tj, loads on the computation of the intensity of interference fringes can then be largely lifted up. That is, what is necessary for performing computations on computation points within the j-th strip area Tj is only to give consideration to object light coming from sample light sources defined on the j-th sectional line Lj.

Thus, when computations are performed with a limited angle of spreading of object light, an interference fringe pattern obtained on the recording surface 20 does not provide an intrinsic hologram pattern, resulting in a failure in obtaining a correct 3D reconstructed image. For instance, when a hologram is fabricated while the angle of spreading of object light in the Y-axis direction is limited as shown typically in FIGS. 15 and 16, a reconstructed image obtained from such a hologram ensures an adequate 3D appearance with respect to the X-axis (lateral) direction, but does not apply any adequate 3D appearance with respect to the Y-axis (longitudinal) direction. Consequently, when the hologram is observed from above or below in an oblique direction, any correct reconstructed image cannot often be obtained. In actual applications such as anti-counterfeiting seals, however, even that hologram offers no practically grave problem, because of being capable of reproducing a reconstructed image ensuring some three-dimensional appearance when observed from a general direction of viewing.

It is noted that when computations are performed while the angle of spreading of object light is limited, it is unnecessary to define the angle of spreading of object light for each sample light source. For actual computations, individual strip areas are first defined on the recording surface 20, and computation points are then defined within each strip area, so that the intensity of interference waves is computed on the individual computation points. What is required in this case is only to identify a sectional line corresponding to the strip area to which said computation points are allocated and perform computations while only object light from sample light sources on that sectional line is taken into consideration. In the embodiment shown in FIG. 16, for instance, a plurality of strip areas T1, T2, . . . , Tj, . . . , TJ corresponding to a plurality of sections are defined, and a multiplicity of computation points are defined in each strip area (for instance, in a matrix pattern having a pitch of 0.6 μm in the X-axis direction and a pitch of 0.25 μm in the Y-axis direction), so that on computation points within the j-th strip area Tj, the intensity of interference waves is computed. What is necessary in this case is only to give consideration to object light from sample light sources located on the j-th sectional line Lj corresponding to the j-th strip area.

Figure 17:
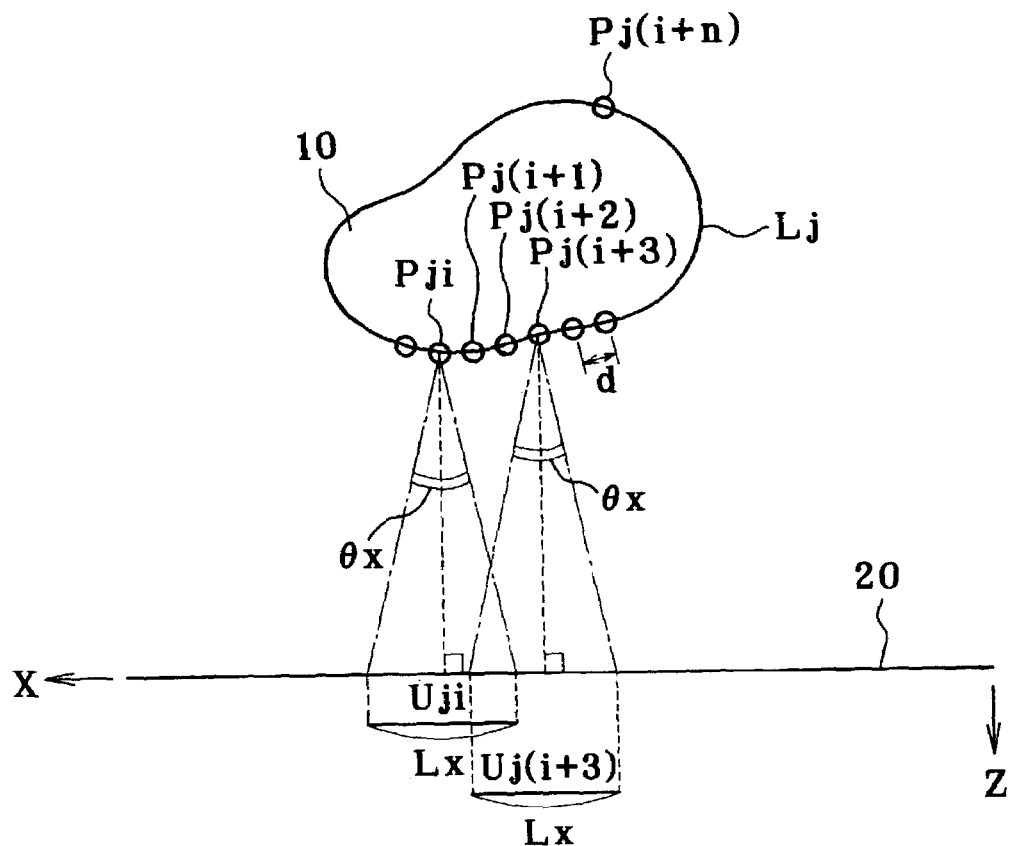
FIG. 17 is a top view illustrative of how object light behaves when both the angle of spreading in the X-axis direction and the angle of spreading in the Y-axis direction are limited.

How to limit the angle of spreading, θy, of object light in the Y-axis direction has been explained. In practical applications, however, it is preferable that the angle of spreading, θx, of object light in the X-axis direction, too, is limited in such a way that object light from one sample light source Pi reaches only within an Ly by Lx unit area Ui, as shown in FIG. 12. FIG. 17 is a top view illustrative of how object light behaves when both the angles of spreading in the X-axis and Y-axis directions are limited. On a sectional line Lj obtained by cutting an original image 10 by a j-th section Sj there are defined a multiplicity of sample light sources at a given spacing d, as shown in FIG. 12. Here, if the angle of spreading of object light in the X-axis direction is limited to an angle θx, object light from an i-th sample light source Pji will reache only within a unit area Uji on a recording surface 20 and object light from a (i+3)-th sample light source Pj(i+3) will reach only within a unit area Uj (i+3) on the recording surface 20. Likewise, object light from a (i+1)-th sample light source Pj(i+1) will reach only within a unit area Uj(i+1) on the recording surface 20 and object light from a (i+2)-th sample light source Pj(i+2) will reach only within a unit area Uj(i+2) on the recording surface 20, although not shown in FIG. 17. In this way, the unit areas Uji, Uj(i+1), Uj(i+2) and Uj(i+3) are slightly displaced while they overlap. It is here noted that object light from a (i+n)-th sample light source Pj(i+n) defined on the back side of an original image 10 is negligible unless the original image 10 is a transparent object (subjected to the so-called hidden surface removal processing).

Figure 18:
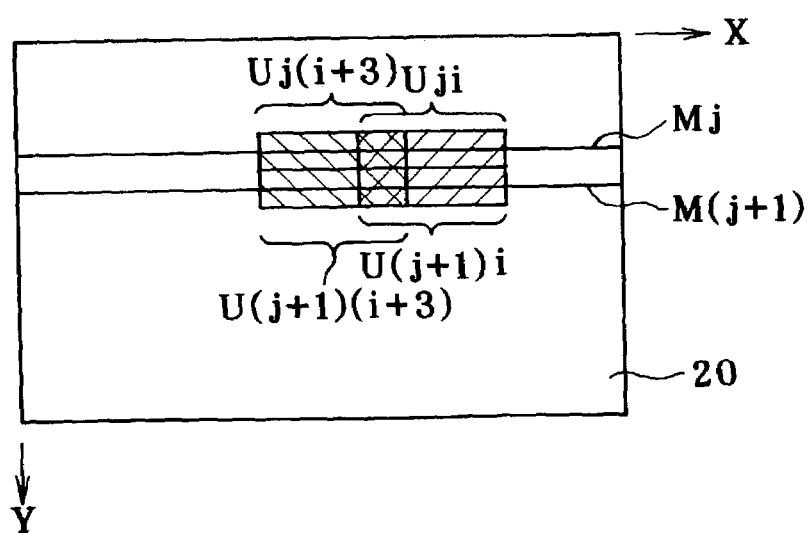
FIG. 18 is a front view of the recording surface of 20 of FIG. 17 as viewed from the original image 10 side.

FIG. 18 is a front view of the recording surface 20 of FIG. 17 as viewed from the original image 10 side. There are unit areas Uji and Uj(i+3) positioned on a line of intersection Mj, at which, as shown in FIG. 17, object light beams from sample light sources Pji and Pj(i+3) on the sectional line Lj arrive, as well as unit areas U(j+1)i and U(j+1)(i+3) positioned on a line of intersection M(j+1), at which object light beams from sample light sources P(j+1)i and P(j+1)(i+3) that go down by a given spacing D arrive. It is understood that on the recording surface 20 there are defined a multiplicity of unit areas that are not shown in FIG. 18, and that these unit areas overlap. Then, a specific unit area on the recording surface 20 corresponds to a specific sample light source on the original image 10. For instance, the unit area Uji on the recording surface 20 corresponds to the specific sample light source Pji on the original image 10.

When both the angles of spreading in the X-axis and Y-axis directions are limited, the computations may be performed as follows. When computing the intensity of interference waves with respect to a certain one computation point on the recording surface 20, it is first required to identify some unit areas inclusive of said computation point. Then, the intensity of interference waves should be computed while only object light beams from sample light sources corresponding to these unit areas are taken into account.

Given such computations with the limited angles of spreading, such areas as shown in FIG. 8 are automatically defined with the proviso that such some original images as shown in FIG. 7 are provided. Specifically, a number of sample light sources are defined on an original image 110. Object light beams from individual sample light sources on the original image 110 then reach only within given unit areas on the recording surface 20, so that an area comprising a set of these unit areas is automatically defined as the area α10 shown in FIG. 8.

By comparison, it is found that the case where the angle of spreading in the Y-axis direction is limited as shown in FIG. 16 is different from the case where both the angles of spreading in the Y-axis and X-axis directions are limited as shown in FIG. 18 in that in the former case information about all sample light sources on the sectional line Lj is recorded in the whole strip area Tj whereas in the latter case information about one sample light source is recorded in overlapping individual unit areas. However, it is noted that if a slender area constructed of a plurality of unit areas lined up on the same line of intersection can be thought of as a strip area (for instance, if an area made up of J unit areas Uj1, Uj2, . . . , Uji, . . . , UjJ lined up on the line of intersection Mj can be thought of as a strip area Tj), then the latter case would be tantamount in construction to the former case, because a multiplicity of strip areas are located in the Y-axis direction.

Figure 19:
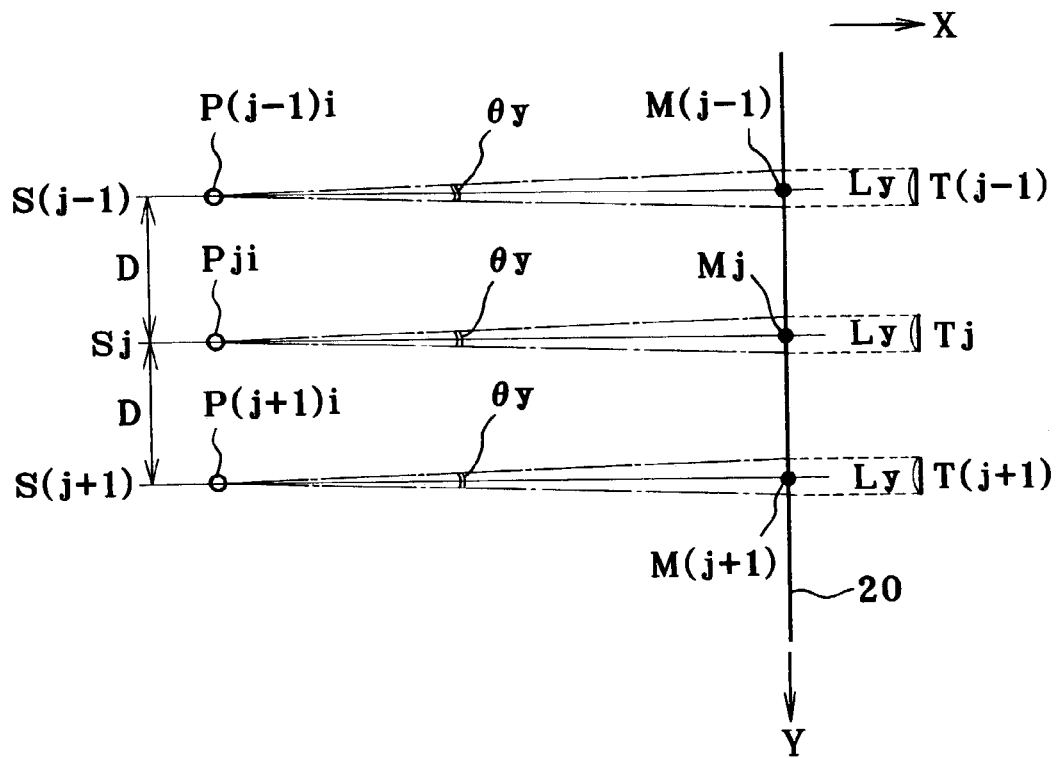
FIG. 19 is a side view illustrative of how object light arrives at a recording surface 20 when the angle of spreading θy shown in FIG. 15 is set at a smaller value.

In the embodiments that have so far been explained, the width Ly of the strip area in the Y-axis direction (or the width of the unit area in the Y-axis direction) is made equal to the section-to-section spacing D, whereby the recording surface 20 is thoroughly filled up with a multiplicity of strip areas located in the Y-axis direction. However, the width Ly of the strip area may be made smaller than the section-to-section spacing D. In this case, on the recording surface 20 there are void areas with no strip areas defined thereon. FIG. 19 is a side schematic illustrative of how object light propagates when the angle of spreading θY shown in FIG. 15 is set at a smaller angle. In FIG. 19, too, strip areas T(j−1), Tj and T(j+1) are defined on a recording surface 20 as is the case with FIG. 15, and on computation points within these strip areas, the intensity values of given interference waves are computed. However, there are void areas between adjacent strip areas, because the width Ly of each strip area is made smaller than the section-to-section spacing D (in FIG. 19, Ly=D/4). Any object light from sample light sources on an original image 10 does not arrive at those void areas on the recording surface 20, and as a matter of course, the intensity values of interference waves are not obtained. Therefore, for the void areas occurring on the recording surface 20, the results of computations of the intensity of interference waves with respect to the adjacent strip areas should be used by copying.

Figure 20:
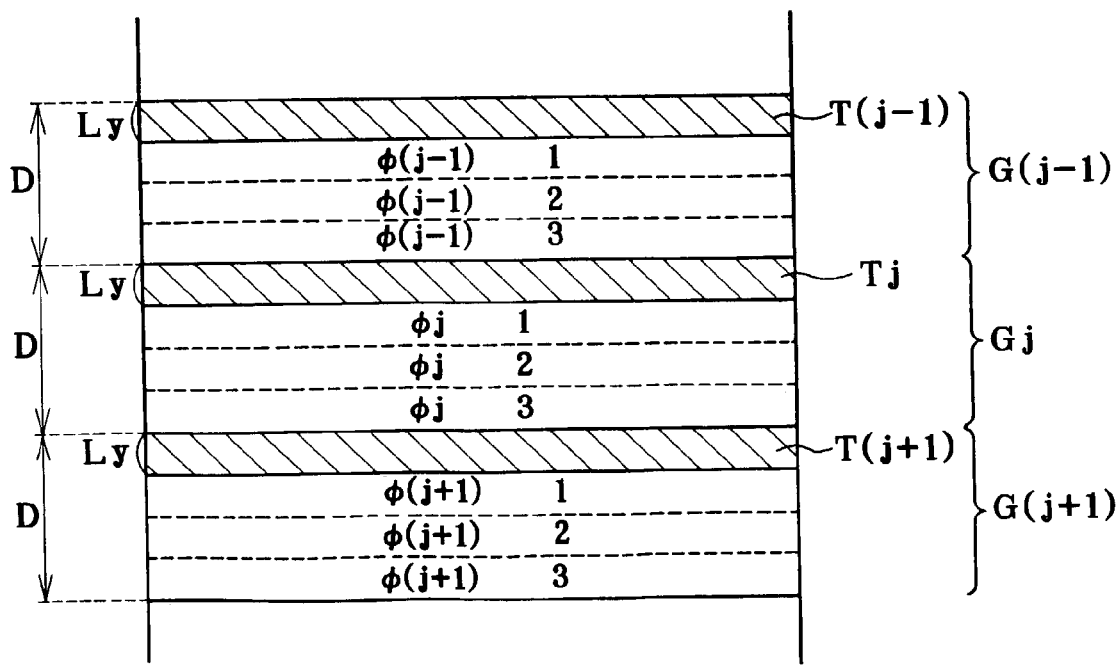
FIG. 20 is a plan view of the recording surface 20 of FIG. 19, explaining the principles of copying the results of computation on a strip area to a void area.

FIG. 20 is a plan view of the recording surface 20 for explaining the principles of copying the results of computations with respect to strip areas to void areas. Strip areas T(j−1), Tj and T(j+1) are represented by hatched areas, and void areas between adjacent strip areas are represented by broken-line areas. The intensity values of interference waves are found on computation points distributed in each strip area; however, no results of computations are obtained with respect to the void areas at all. In FIG. 20, the results of computation obtained with respect to the interior of the strip area T(j−1) for instance are copied to three void areas φ(j−1)1, φ(j−1)2 and φ(j−1)3, the results of computation found with respect to the interior of the strip area Tj are copied to three void areas φj1, φj2 and φj3, and the results of computation obtained with respect to the interior of the strip area T(j+1) are copied to three void areas +(j+1)1, φ(j+1)2 and φ(j+1)3. By doing so, it is possible to find the results of computations of interference wave intensities on the whole recording surface 20.

Given such copying, each of the areas indicated by groups G(j−1), Gj and G(j+1) may be regarded as an area where four strip areas having the same interference fringes recorded therein are located in a continuously repetitive fashion. It is understood that the hologram fabricated by such copying is not an intrinsic hologram, and so any intrinsic 3D reconstructed image is not obtained; however, this hologram has the merit of dispensing with computations on the void areas, resulting in substantial reductions in loads on general computations. More specifically, the width of the strip area in the Y-axis direction may be set at Ly=about 1 μm.

Figure 21:
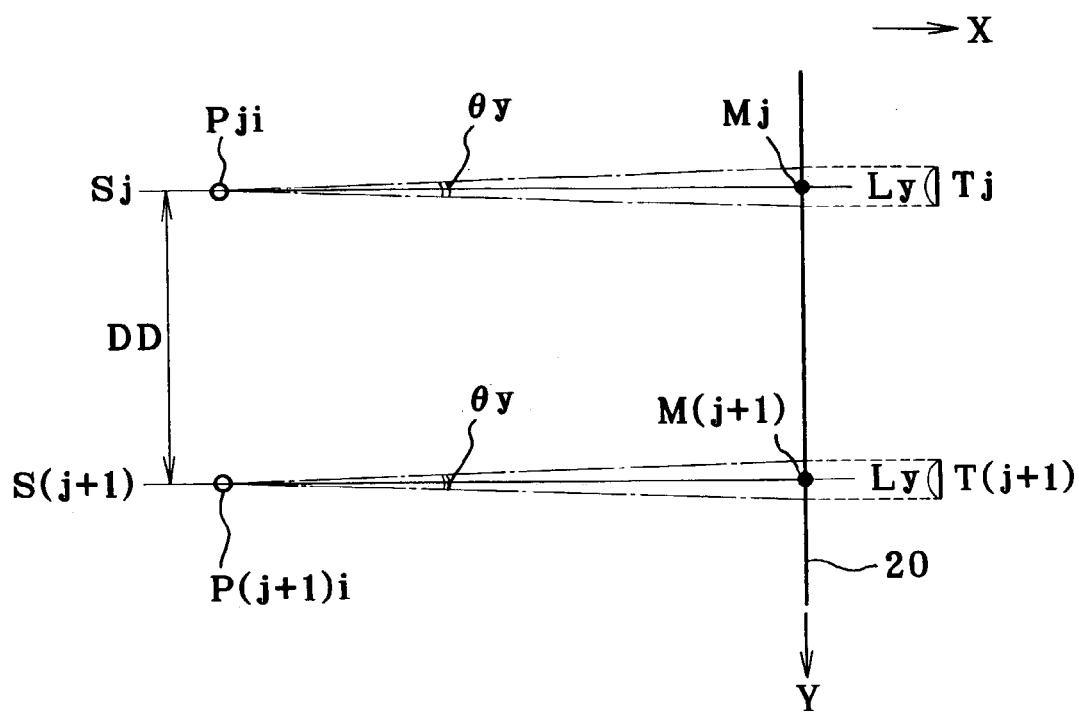
FIG. 21 is a side schematic illustrative of how object light arrives at a recording surface when the section-to-section spacing D of FIG. 19 is enlarged.
Figure 22:
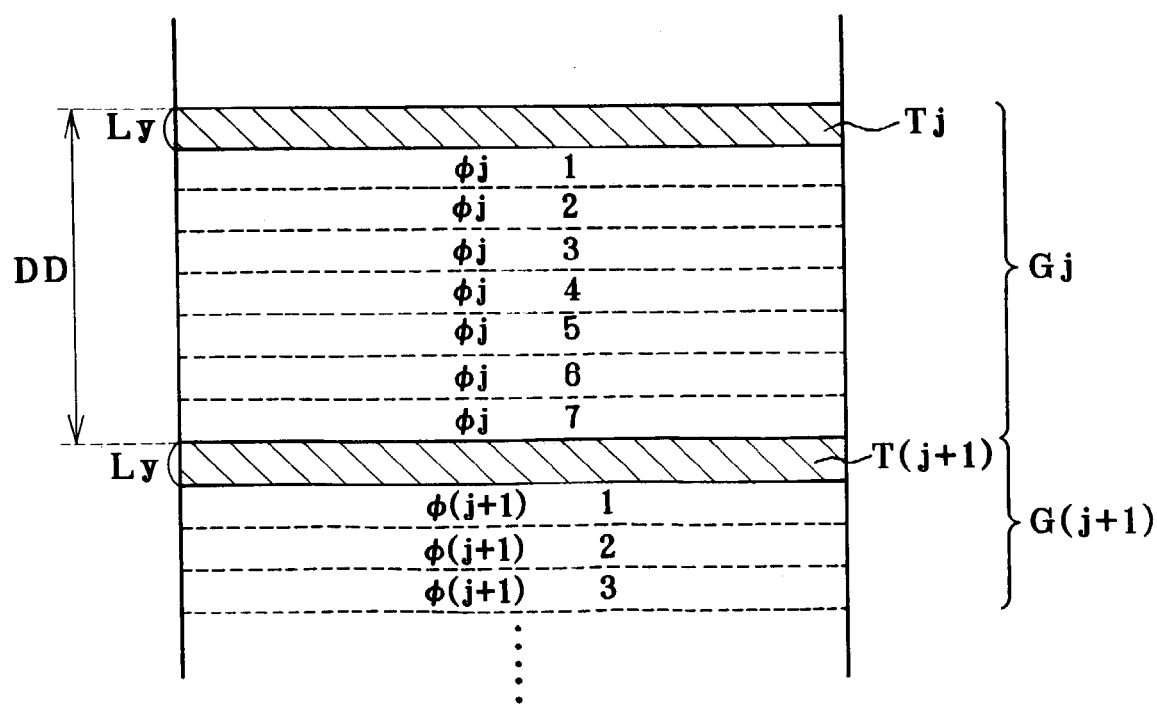
FIG. 22 is a plan view of the recording surface of FIG. 21, explaining the principles of copying the results of computations on strip areas to void areas.

The feature of the present invention is that the spatial density of sample light sources varies for each original image. As already set forth, the spatial density of sample light sources may be adjusted by the section-to-section spacing D. Accordingly, when reliance is placed on the method of copying the results of computation to the aforesaid void areas, the section-to-section spacing D is a determinative parameter for the number of repetition of copying. In the embodiment of FIG. 19, for instance, the sections are located at the spacing D. However, if this spacing D is doubled to DD=2D, such results as shown in FIG. 21 are obtained. That is, although there is no change in the width Ly of the strip area Tj or T(j+1), the void areas enlarge so that when the contents of interference fringes in the strip areas are copied to the void areas, the number of repetition increases accordingly. To be specific, it is required to copy the results of computations obtained on the interior of the strip area Tj to seven void areas φj1 to φj7, as shown in FIG. 22. As a result, the area given by group Gj in FIG. 22 provides an area where eight strip areas having the same interference fringes recorded therein are located in a continuously repetitive fashion.

§4. Hologram-Recorded Medium of the Invention

So far, the computer-generated hologram fabrication process according to the present invention has been described with reference to some embodiments. The features of the hologram-recorded medium fabricated by the process according to the present invention are now explained. It is noted that the term "hologram-recorded medium" used herein broadly means a hologram optical pattern fixed on a physical medium of some kind, said pattern being formed on a recording surface 20 by means of computer-aided computations, and so includes, for instance, a master hologram with an interference fringe pattern written thereon using an electron beam lithographic system, a replica fabricated using this master hologram, and a medium obtained by providing a film form of reflecting layer on the replica.

The rudimentary features of the hologram-recorded medium according to the present invention are that a plurality of original images are recorded, information is recorded in a separate recording area for each original image, information carried by object light emitted from a multiplicity of sample light sources defined on the original images to be recorded is recorded in individual recording areas, and the spatial densities of sample light sources on at least two different original images differ from each other. Referring to a hologram-recorded medium wherein an interference fringe pattern formed on a recording surface 20 shown in FIG. 8 as an example is physically fixed, a total of ten original images 121–129 and 110 are recorded. These original images are recorded in separate recording areas α1–α10 in the form of information carried by object light emitted from a multiplicity of sample light sources. In addition, the spatial density of sample light sources on the original image 110 differs from that of sample light sources on the original images 121–129. More specifically, the original image 110 is a visually perceivable image whereas the original images 121–129 are each an image comprising visually unperceivable micro-characters (characters having a maximum size of 300 μm or less), and the spatial density of sample light sources on the original images 121–129 is made higher than that on the original image 110. To vary the spatial density of sample light sources, a multiplicity of sections should be defined in such a way as to be kept parallel with each other at a given spacing D, as already explained, so that groups of sample light sources are defined on sectional lines formed by the sections, thereby varying the given spacing D for each original image. As an example, the spacing D should be set at 30 μm or greater for a visually perceivable original image like the original image 110 so that a multiplicity of sections can be defined, and the spacing D should be set at less than 30 μm for visually unperceivable original images like the original images 121–129 so that a multiplicity of sections can be defined.

Referring to a hologram-recorded medium that is fabricated by the method of copying an interference fringe pattern for each strip area as shown typically in FIG. 20 or FIG. 22, a multiplicity of strip areas of the same rectangular shape are lined up on the recording surface, so that given interference fringes are recorded in each strip area and a given number of strip areas having the same interference fringes recorded therein are located in a continuously repetitive fashion. It is understood that with the fundamental features of the hologram-recorded medium according to the present invention, there is achieved a unique structure wherein a separate recording area is defined on the recording surface for each original image, and the number of continuously lined-up strip areas having the same interference fringes recorded therein differs with respect to at least two recording areas. For instance, at the original image-recording area cut by sections at the given spacing D as shown in FIG. 19 so as to define sample light sources at a high density, the number of continuously lined-up strip areas having the same interference fringes recorded therein is four as shown in FIG. 20. At the original image-recording area cut by sections at the given spacing DD as shown in FIG. 21 so as to define sample light sources at a low density, however, the number of continuously lined-up strip areas having the same interference fringes recorded therein is eight as shown in FIG. 22.

The hologram-recorded medium having such features as mentioned above may be fabricated by the processes explained in §1 through §3, and has the merit of lifting up loads on computations for obtaining interference fringe patterns. Thus, the hologram-recorded medium of the present invention affords convenience to commercial mass-production.

It is noted that the computer-generated hologram fabrication process and the hologram-recorded medium according to the present invention may be used in combination with a method of recording the original images using a diffracting grating pattern. For instance, a pattern comprising a diffraction grating or the like may be formed in the area α0 in FIG. 8 or FIG. 10. Alternatively, four original images 121, 123, 127 and 129 out of a plurality of original images shown in FIG. 7 may be each recorded in the form of a diffraction grating pattern rather than interference fringes.

§5. Method of Recording Complex Amplitude Information

In the embodiments that have so far been set forth, information about original images is recorded on the recording surface 20 in the form of interference fringes of object light and reference light according to the basic principles shown in FIG. 1. With the computer-generated hologram methodology, however, it is not always necessary to record the original image 10 in the form of interference fringes using reference light R; object light from the original image 10 may be recorded as such directly on the recording surface 20. That is, when a hologram is optically fabricated, it is required to generate interference waves on a recording medium 20 comprising a photosensitive material over the constant time needed for photosensitization and record them as interference fringes. For this reason, it is required to generate interference waves that become stationary waves, utilizing reference light. With the computer-generated hologram methodology, however, a momentary state of waves existing on the recording surface 20 can be observed as if time were at a standstill, so that it can be recorded. To put it another way, the amplitude and phase (complex amplitude information) of object light on each computation point on the recording surface 20 at a given reference time can be found by computation. If the thus found complex amplitude information is recorded on the recording surface, it is then possible to record the original image 10 as an optical pattern. A typical example of the method of recording the complex amplitude information of object light emitted from the original image 10 is set forth in Japanese Patent Application No. 2000-265042, and the technical idea according to the present invention may be applied to such a complex amplitude information-recording method as well. The basic principles of recording this complex amplitude information are now briefly explained.

Figure 23:
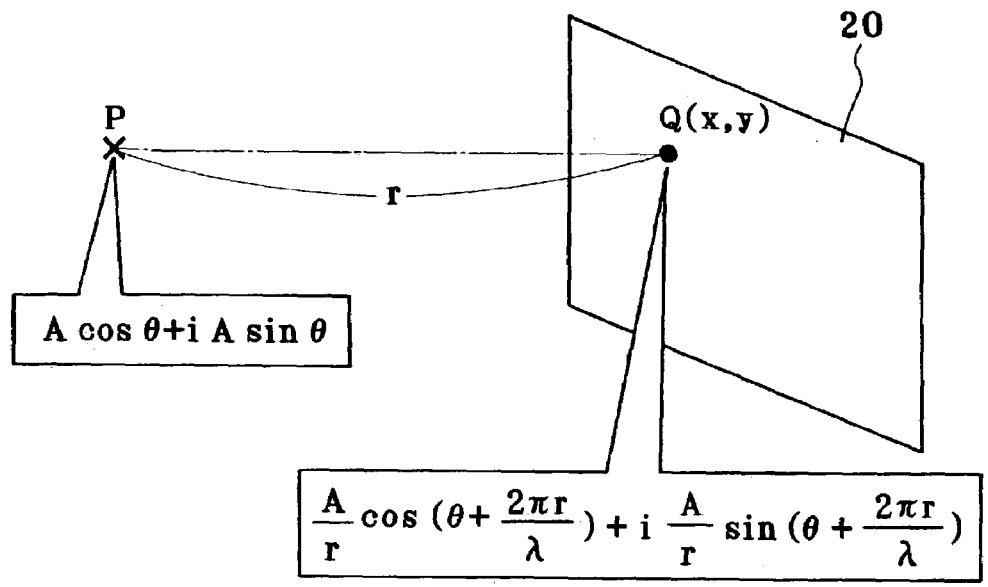
FIG. 23 is a perspective view illustrative of the amplitude and phase of object light arriving at a computation point Q(x, y) on a recording surface in the case where a sample light source P and the recording surface 20 are defined.

Suppose now that a sample light source (point light source) P and a recording surface 20 are defined as shown in the perspective view of FIG. 23, and consider how the amplitude and phase of object light arriving at a computation point Q(x, y) on the recording surface 20 is computed. In consideration of amplitude and phase, wave motion is generally represented by the following complex function:

$$A \cos \theta + i A \sin \theta$$

where i is an imaginary unit, A is a parameter indicative of amplitude and θ is a parameter indicative of phase. If object light emitted from the point light source P is defined in terms of this complex function, then object light at the position of computation point Q(x, y) is given by the following complex function:

$$A/r \cos (\theta + 2\pi r/\lambda) + i A/r \sin (\theta + 2\pi r/\lambda)$$

where r is the distance between the point light source P and the computation point Q(x, y), and λ is the wavelength of object light. The amplitude of object light attenuates with increasing distance r, and the phase is determined depending on the distance r vs. wavelength λ relationship. This complex function has no variable indicative of time, because of being a function indicative of a momentary state of the wave observed when time is at a standstill at a given reference time.

Figure 24:
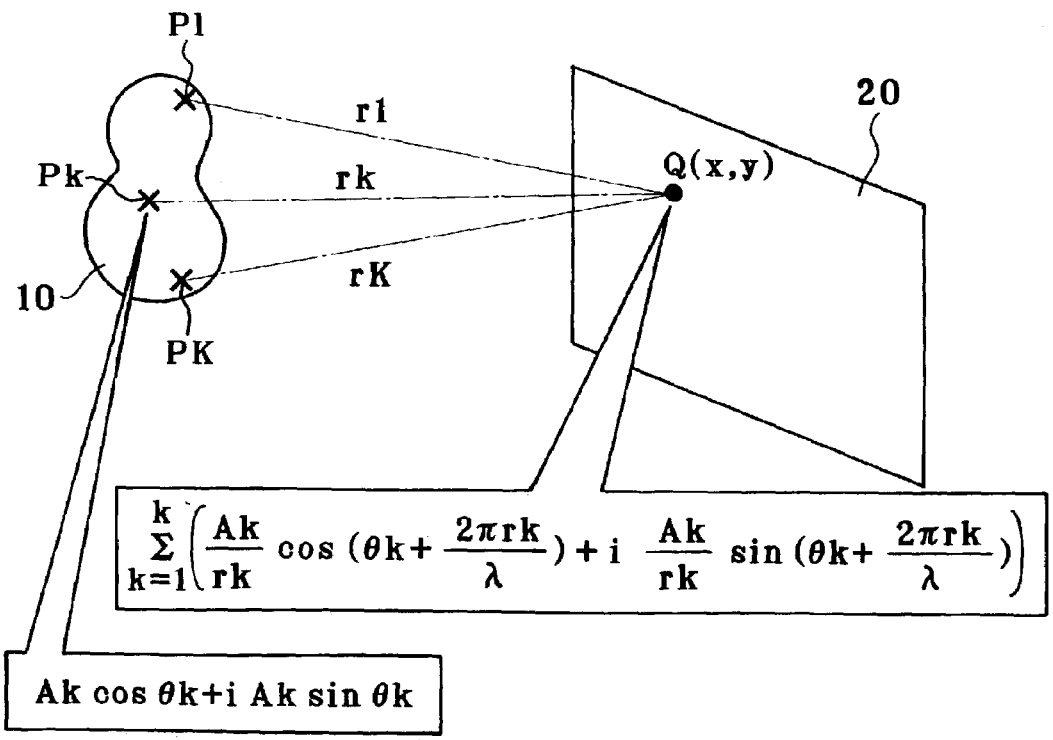
FIG. 24 is a perspective schematic illustrative of the complex amplitude of object light at the position of a computation point Q(x, y) in the case where object light emitted from each sample light source on an original image 10 arrives at the computation point Q(x, y) on a recording surface 20.

That is, to record information about the original image 10 on the recording surface 20, a multiplicity of sample light sources, i.e., point light sources P1, P2, ..., Pk, PK should be defined on the original image 10, and the amplitude and phase of the combined wave of object light emitted from each point light source are found by computation at the position of each computation point on the recording surface 20, followed by recording of them by some means. Suppose now that while a total of K point light sources are defined on the original image 10, object light emitted from a k-th point light source Pk is represented by such a complex function as shown in FIG. 24, i.e., $$Ak \cos \theta k + i Ak \sin \theta k$$

If the original image 10 is made up of a set of pixels each having a given gray-scale (concentration) value, the parameter Ak indicative of amplitude will be as a matter of course determined corresponding to the gray-scale value of the pixel existing at the position of the point light source Pk. It is generally acceptable that the phase Ok is set at θk=0; if necessary, however, the phase may be set in such a way that object light of different phase is emitted from each part of the original image 10. Once object light represented by the aforesaid complex function has been defined with respect to all of K point light sources, the combined wave of a total of K object light beams at the position of any arbitrary computation point Q(x, y) on the recording surface 20 is represented by such a complex function as shown in FIG. 24, i.e., $$\Sigma_{k=1-K}(Ak/rk \cos (\theta k+2\pi rk/\lambda)+i Ak/rk \sin (\theta k+2\pi rk/\lambda))$$

where k is the distance between the k-th point light source Pk and the computation point Q(x, y). This function holds true for the case where the original image 10 is reconstructed in the rear of the recording medium. When the original image 10 is reconstructed in front of the recording medium, the complex function to be applied is given by $$\Sigma_{k=1-K}(Ak/rk \cos(\theta k-2\pi rk/\lambda)+i Ak/rk \sin (\theta k-2\pi rk/\lambda))$$

where the sign of the phase term is minus. In consideration of both, the complex function is given by $$\Sigma_{k=1-K}(Ak/rk \cos(\theta k\pm 2\pi rk/\lambda)+i Ak/rk \sin (\theta k\pm 2\pi rk/\lambda))$$

Figure 25:
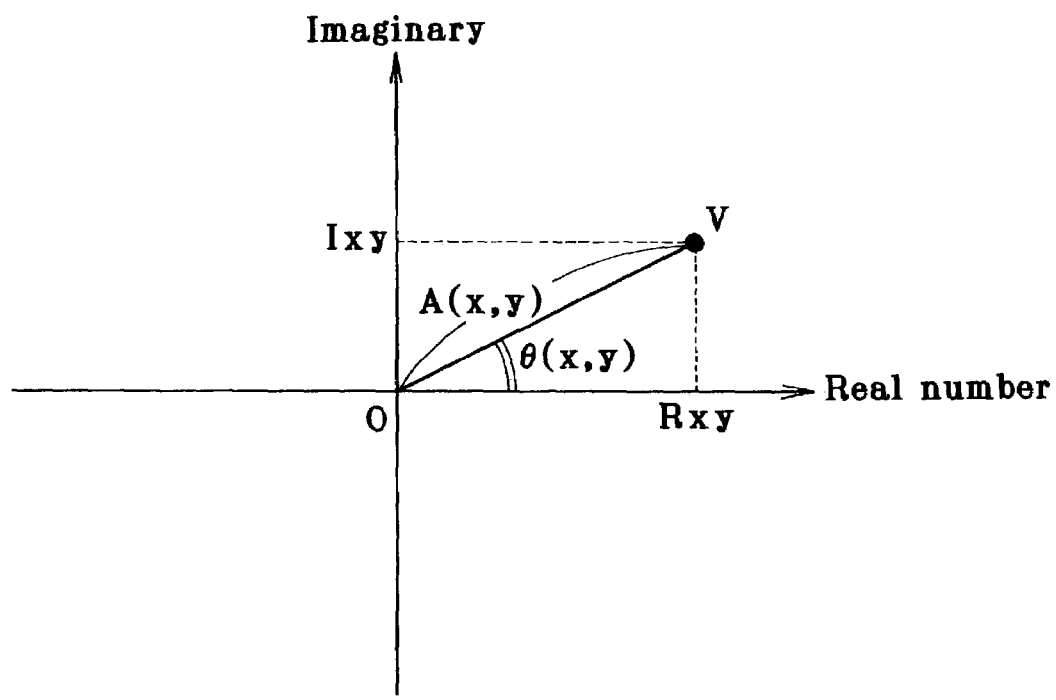
FIG. 25 is illustrative of how amplitude A(x, y) and phase θ(x, y) are found on the basis of an amplitude shown by a coordinate point V on a complex coordinate plane.

If this function is rewritten in the form of Rxy+iIxy where Rxy is a real part and Ixy is an imaginary part, the complex amplitude (an amplitude with consideration given to phase) of this combined wave at the position of the computation point Q(x, y) is represented by a coordinate point V on a complex coordinate plane, as shown in FIG. 25. The result is that the amplitude of the combined wave of object light at the computation point Q(x, y) is given by a distance A(x, y) between the origin O and the coordinate point V on the coordinate plane of FIG. 25, and the phase is given by an angle θ(x, y) of a vector OV with a real number axis.

Thus, the amplitude A(x, y) and phase θ(x, y) of the combined wave of object light at the position of any arbitrary computation point Q(x, y) defined on the recording surface 20 is found by calculation. Hence, the complex amplitude distribution (the distribution of the amplitude and phase of the combined wave of object light) of object light emitted from the original image 10 is obtained on the recording surface 20. The thus obtained complex amplitude distribution is physically recorded on a physical recording medium by some means in such a way that upon illumination with given reconstructing light, the wavefronts of object light are reconstructed. In this way, the original image 10 can be recorded on the physical recording medium.

Figure 26:
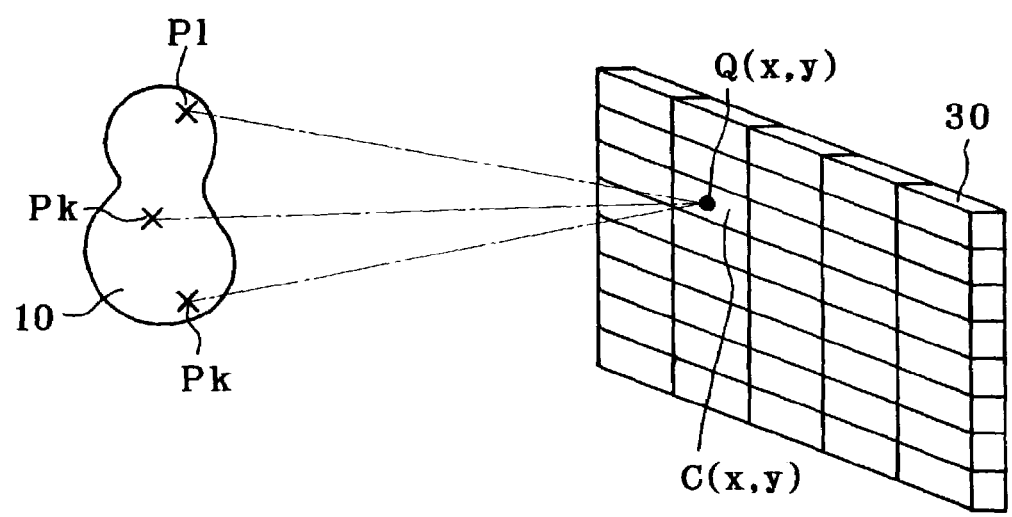
FIG. 26 is a perspective schematic illustrative of one exemplary set 30 of three-dimensional virtual cells defined for the purpose of recording an original image 10.

To record on the recording surface 20 the complex amplitude distribution of object light emitted from the original image 10, a three-dimensional cell may be used. When the complex amplitude distribution is recorded using the three-dimensional cell to record the original image 10 as a hologram, it is preferable to carry out such steps as set forth just below. As shown typically in FIG. 26, a set 30 of three-dimensional virtual cells are first defined at the position of the recording surface 20. In this set 30 of three-dimensional virtual cells, virtual cells in the form of blocks having given size are arranged two-dimensionally in a matrix arrangement. Here, one single virtual cell is assumed to have one computation point therein. Although the computation point may be positioned at any one single point within the cell, it is here understood that the computation point is located at the position of the central point of the front surface of the cell (which faces the original image 10). For instance, an XY coordinate system is defined on the front surface of the three-dimensional virtual cell set 30 (which faces the original image 10). Here, if a virtual cell having a certain computation point Q(x, y) at a position on coordinates (x, y) in this coordinate system is called a virtual cell C(x, y), then the computation point Q(x, y) is positioned at the central point of the front surface of that virtual cell C(x, y). In summary, one single virtual cell should preferably be positioned in the vicinity of one computation point.

On the original image 10, on the other hand, there are defined a multiplicity of sample light sources, as already explained. In the embodiment shown in FIG. 26, the original image 10 is defined as a set of K point light sources P1, P2, . . . , Pk, PK. The combined wave of object light, emitted from each point light source with given amplitude and phase, arrives at the computation point Q(x, y). The complex amplitude of this combined wave may be calculated from the aforesaid formulae, and shown as a coordinate point V on the complex coordinate plane shown in FIG. 25. Based on this coordinate point V, the amplitude A(x, y) and phase θ(x, y) are obtained as already set forth. Here, the amplitude A(x, y) and phase θ(x, y) obtained on the computation point Q(x, y) is called a specific amplitude A(x, y) and a specific phase θ(x, y) with respect to said computation point Q(x, y).

The foregoing steps are actually implemented as computation processing using a computer. The results are that specific amplitudes and specific phases can be found on all computation points, and specific amplitudes and specific phases can be found for all virtual cells that form the three-dimensional virtual cell set 30. Accordingly, if these individual virtual cells are replaced by physically substantial cells, then it is possible to fabricate an optical element comprising a set of three-dimensional physical cells (a hologram medium with the original image 10 recorded therein). It is understood that the physical cell used for the virtual cell must have such optical properties as to modulate the amplitude and phase of incident light depending on the specific amplitude and specific phase defined for the virtual cell. To put it another way, the physical cell must have specific optical properties in such a way that upon receipt of specific incident light, the amplitude and phase of the incident light vary depending on the specific amplitude and specific phase defined for the corresponding virtual cell, thereby producing emergent light.

If an optical element comprising a set of physical cells, each having such specific optical properties, is irradiated with given reconstructing illumination light (that is ideally a chromatic light plane wave having the same wavelength as that of object light used in the aforesaid computation processing), then the reconstructing illumination light is modulated by the specific amplitude and phase at an individual physical cell, resulting in reconstruction of the wavefronts of the object light. In this way, the hologram recorded in the optical element is reconstructed.

The construction of the aforesaid physical cell is now explained more specifically. Fundamentally, the physical cell used herein is a three-dimensional cell that is not critical in construction with the exception that a specific amplitude and a specific phase are defined thereon; the essential optical requirement therefor is that upon receipt of given incident light, there is obtained emergent light in which the amplitude and phase of incident light are changed depending on the specific amplitude and specific phase defined on said cell. In short, the physical cell is designed in such a way that a specific amplitude A(x, y) and a specific phase θ(x, y) are recorded with respect to a three-dimensional cell C(x, y) located at a computation point Q(x, Y), and when incident light Lin having amplitude Ain and phase θin is applied to that cell, there is obtained emergent light Lout whose amplitude is Aout=Ain·A(x, y) and whose phase is θout=θin±θ(x, y). The amplitude Ain of incident light changes to the amplitude Aout upon modulation by the specific amplitude A(x, y) recorded in the cell, and the phase θin of incident light changes to the phase θout upon modulation by the specific phase θ(x, y) by the specific phase θ(x, y) recorded in the cell.

One method of amplitude modulation in the three-dimensional cell is to allow the cell to have therein an amplitude modulation region having a transmittance consistent with a specific amplitude. In this case, the whole cell may be designed as an amplitude modulation region or a part of the cell may be provided with an amplitude modulation region. For instance, a cell with an amplitude modulation region having a transmittance of Z % functions as a cell having a specific amplitude represented by A(x, y)=Z/100. As incident light passes through this cell, it is turned by amplitude modulation into emergent light having an amplitude represented by Aout=Ain·Z/100. Setting the transmittance of individual three-dimensional cells at any desired value may be achieved by varying the content of a coloring agent therein.

Another method of amplitude modulation in the three-dimensional cell is to allow the cell to have therein an amplitude modulation region having a reflectivity consistent with a specific amplitude. For instance, a cell with an amplitude modulation region having a reflectivity of Z % functions as a cell in which a specific amplitude represented by A(x, y)=Z/100 is recorded. If incident light having an amplitude Ain is reflected off at this amplitude modulation region, it is then turned by amplitude modulation into emergent light having an amplitude given by Aout=Ain Z/100. Setting the reflectivity of individual three-dimensional cells at any desired value may be achieved by providing a reflecting surface in the cell (which functions as an amplitude modulation region) and setting the reflectivity of this reflecting surface at any desired value. More specifically, the ratio of reflected light and scattered light may be regulated by varying the surface roughness of the reflecting surface; it is possible to provide a cell having any desired reflectivity by regulation of that reflecting surface.

Yet another method of amplitude modulation in a three-dimensional cell is to allow the cell to have therein an amplitude modulation region having an effective area consistent with a specific amplitude. For instance, referring to a cell having an amplitude modulation region comprising a structure designed such that when the area of a region receiving all of incident light is assumed to be 100%, emergent light effective for the reconstruction of an object image is available from only light incident on a portion having an effective area of Z %, this cell functions as a cell in which a specific amplitude represented by $A(x, y)=Z/100$ is recorded. That is, even when light having an amplitude Ain is incident on this amplitude modulation region, only Z % of that light leaves as effective emergent light; that emergent light is modulated to an amplitude represented by $Aout=Ain \cdot Z/100$. To obtain effective emergent light from only a region portion having such a specific effective area, it is preferable to use a cell having a physical pit-and-projection structure.

One method of phase modulation in a three-dimensional cell, on the other hand, is to allow the cell to have therein a phase modulation region having a refractive index consistent with a specific phase. The whole cell may be designed as a phase modulation region or a part of the cell may be provided with a phase modulation region. Between a cell having a phase modulation region formed of a material having a refractive index of n1 and a cell having a phase modulation region formed of a material having a refractive index of n2, there is a difference in the phase of emergent light, even upon the application thereto of incident light having the same phase. Accordingly, if a cell is made up of various materials having varying refractive indices, incident light can then be subjected to any desired phase modulation.

Another method of phase modulation in a three-dimensional cell is to allow the cell to have therein a phase modulation region having an optical path length consistent with a specific phase. The whole cell may be designed as a phase modulation region or a part of the cell may be provided with a phase modulation region. For instance, consider now cells having a phase modulation region formed of the same material having a refractive index of n but having varying optical path lengths. If incident light having the same phase is applied to the cells, there will be a difference in the phase of emergent light. For instance, suppose now that the first cell had a phase modulation region having an optical path length L and the second cell has a phase modulation region having an optical path length 2L and incident light having the same phase were applied to both. Emergent light leaving the second cell will be twice longer than emergent light leaving the first cell in terms of the length of the optical path taken by the incident light through the material having a refractive index of n. Thus, there is some large phase difference. In order to achieve a phase modulation region having any desired optical path length, it is preferable to use a cell having a physical pit-and-projection structure.

Thus, three-dimensional cells having an amplitude modulation function based on a specific amplitude or a phase modulation function based on a specific phase may be achieved by several methods, and any desired selection may be made from the aforesaid several amplitude or phase modulation methods. For instance, if the whole cell is used as an amplitude modulation region formed therein with a transmittance consistent with a specific amplitude and a phase modulation region formed therein with a refractive index consistent with a specific phase, it is then possible to form an optical element by selective arrangement of such 16 physical cells as shown in the table of FIG. 27 with amplitude A as abscissa and phase θ as ordinate; amplitude A, and phase θ being divided into four ranges.

The cells depicted in the range with amplitude A corresponding to "0 to 25%" (those in the first row) are formed of a material having a very low transmittance, the cells depicted in the range with amplitude A corresponding to "25 to 50%" (those in the second row) a material having a somewhat low transmittance, the cells depicted in the range with amplitude A corresponding to "50 to 75%" (those in the third row) a material having a somewhat high transmittance, and the cells depicted in the range with amplitude A corresponding to "75 to 100%" (those in the fourth row) a material having a very high transmittance. On the other hand, the cells depicted in the range with phase θ corresponding to "0 to π/2" (those in the first column) are formed of a material having a refractive index n1 that is very close to that of air, the cells depicted in the range with phase θ corresponding to "π/2 to π" (those in the second column) a material having a refractive index n2 that is somewhat larger than that of air, the cells depicted in the range with phase θ corresponding to "π to 3π/2" (those in the third column) a material having a refractive index n3 that is larger than that of air, and the cells depicted in the range with phase θ corresponding to "3π/2 to 2π" (those in the fourth column) a material having a refractive index n4 that is much larger than that of air.

Thus, in the embodiment shown in FIG. 27, a total of 16 cells having four transmittances and four refractive indices are in readiness for recording. In order to record amplitude and phase in the cells with higher precision, it is preferable to further divide the steps of transmittance and refractive index and keep much more cells in readiness. When the virtual cells are replaced by 16 such physical cells, it is preferable to selectively use physical cells having optical properties closest to those needed for modulation by a specific amplitude and a specific phase defined for each virtual cell.

FIG. 28 is a perspective schematic illustrative of one exemplary structure of a physical cell $C(x, y)$ capable of amplitude modulation and phase modulation by yet another method. As shown, this three-dimensional physical cell has a substantially cuboidal block form, and is provided on its surface with a groove $G(x, y)$. In the embodiment shown, the dimensions of the physical cell $C(x, y)$ are C1=0.6 μm, C2=0.25 μm and C3=0.25 μm, and the dimensions of the groove $G(x, y)$ are G1=0.2 μm, G2=0.05 μm and G3=C3=0.25 μm. If the physical structure $C(x, y)$ having such structure is used, it is then possible to record amplitude information as the value of the lateral width G1 of the groove $G(x, y)$ and record phase information as the value of the depth G2 of the groove $G(x, y)$. This is because there is a difference in the index of refraction between the interior of the physical cell $C(x, y)$ and the outside air, and so there is a difference in the optical path taken by light through the outside space between light L1 incident vertically on the bottom surface S1 of the groove $G(x, y)$ and light L2 incident vertically on the surfaces S2 of both sides of the groove $G(x, y)$. Accordingly, when virtual cells having a specifically defined amplitude and a specifically defined phase are replaced by physical cells having such structure, it is preferable to use physical cells having a size G1 consistent with the specific amplitude and a size G2 consistent with the specific phase.

Figure 29:
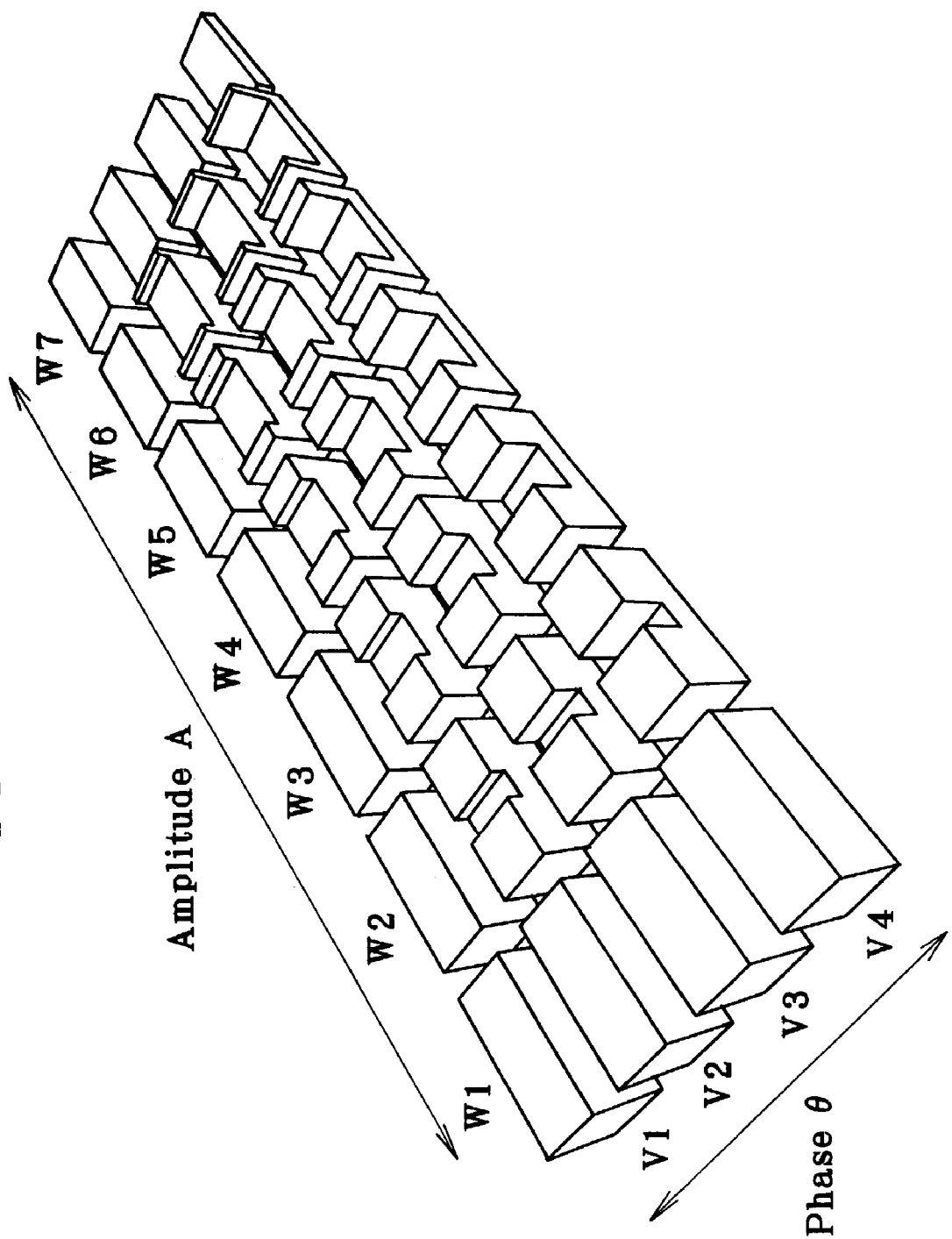
FIG. 29 is a perspective schematic illustrative of a total of 28 physical cells having 7 predetermined groove widths and 4 predetermined groove depths, each cell being defined by such a physical cell C(x, y) as shown in FIG. 28.

In the physical cell C(x, y) having such a groove G(x, y) as shown in FIG. 28, the width G1 and depth G2 of the groove is continuously variable, and so it is theoretically possible to keep unlimited types of physical cells in readiness. It is thus possible to replace virtual cells by physical cells selected from unlimited types of physical cells and having a precise groove width G1 consistent with a specific amplitude on said virtual cells and a precise depth G2 consistent with a specific phase defined thereon. In practical applications, however, it is preferable to select physical cells having optical properties closest to the necessary optical properties from a total of a×b physical cells where a is the number of predetermined groove widths and b is the number of predetermined groove depths. FIG. 29 is a perspective schematic illustrative of a total of 28 physical cells having seven predetermined groove widths and four predetermined groove depths. Each of the 28 physical cells is a physical cell in such a form as shown in FIG. 28. FIG. 29 is illustrative of these physical cells being located in a matrix arrangement with four columns and seven rows.

The seven rows of the matrix arrangement shown in FIG. 29 are indicative of variations of amplitude A, and the four columns are indicative of variations of phase θ. For instance, the cells located in the row W1 have a minimum value for amplitude A, and G1=0, i.e., no groove G is provided at all. The amplitude A increases in order from row W2 to W7 or from the left to the right, and the groove width G1 becomes gradually wide, correspondingly. The cells positioned in the row W7 have a maximum value for amplitude A, and the groove width G1=the cell width C1, i.e., the top of each cell is fully cut out. Referring to the columns of the matrix arrangement shown in FIG. 29, for instance, the cells positioned in the column V1 have a minimum value for phase θ, and the groove depth G2=0, i.e., any groove is not provided at all. The phase θ increases in order from V2 to V4 or from above to below, and the groove depth G2 becomes gradually large, correspondingly.

The basic principles of how to record the complex amplitude information of object light have briefly been explained. In short, this method relies on computation of the complex amplitude of object light, instead of computation of the intensity of interference waves of object light and reference light, at the positions of individual computation points. Accordingly, even when the computation of the complex amplitude discussed in §5 instead of the intensity of interference waves is applied to the embodiments discussed in §1 through 4, it is possible to carry out the present invention because there is no substantial modification to the essential technical idea of the present invention.

According to the present invention detailed above, when holograms for original images including fine patterns comprising micro-characters, etc. are fabricated by computations, it is possible to lift up loads on computer-aided computations.

What we claim is:

1. A process of fabricating a computer-generated hologram having interference fringes recorded on a given recording surface by computer-aided computation, which comprises steps of:

defining 2 to K original images, a recording surface for recording the original images, and reference light with which the recording surface is irradiated and which corresponds to said 2 to K original images, and defining a multiplicity of sample light sources on each original image and defining a multiplicity of computation points on the recording surface, whereby for each computation point, the intensity of interference waves formed by object light coming from all or some of the sample light sources and reference light is so found by computation that interference fringes having the thus found intensity distribution are formed on the recording surface as a hologram for the K original images, wherein:

process settings are such that spatial densities of sample light sources defined on at least two different original images differ from each other, wherein:

a plurality of sections located parallel with one another at a given spacing are defined, and sample light sources arranged at a given spacing on a section line obtained by cutting the surface of the original image by each section are defined, so that the spatial density of the sample light sources is varied by varying a section-to-section spacing for each original image.

2. The computer-generated hologram fabrication process according to claim 1, wherein:

the recording surface intersects each section with a given line of intersection having a given width to form a strip area, and the intensity of interference fringes or the complex amplitude of object light is computed under such conditions that object light emitted from sample light sources arranged on a sectional line obtained by a j-th section arrives only within a strip area formed by a line of intersection of the j-th section with the recording surface.

3. The computer-generated hologram fabrication process according to claim 2, wherein:

the width of the strip area is made narrower than the section-to-section spacing, thereby forming on the recording surface a void space wherein any strip area is not defined, said void space being utilized while the results of computation of the interference waves or the complex amplitude of object light with respect to a strip area adjacent thereto are copied thereto.

4. A process of fabricating a computer-generated hologram having interference fringes recorded on a given recording surface by computer-aided computation, which comprises steps of:

defining 2 to K original images, a recording surface for recording the original images, and reference light with which the recording surface is irradiated and which corresponds to said 2 to K original images, and defining a multiplicity of sample light sources on each original image and defining a multiplicity of computation points on the recording surface, whereby for each computation point, the intensity of interference waves formed by object light coming from all or some of the sample light sources and reference light is so found by computation that interference fringes having the thus found intensity distribution are formed on the recording surface as a hologram for the K original images, wherein:

process settings are such that spatial densities of sample light sources defined on at least two different original images differ from each other, wherein:

a first original image of visually perceivable size and a second original image of visually unperceivable size are defined, and a spatial density of sample light sources defined on the second original image is made higher than that of sample light sources defined on the first original image.

5. A computer-generated hologram fabrication process according to claim 4, wherein:
the second original image comprises a character.

6. The computer-generated hologram fabrication process according to claim 5, wherein:
the character has a maximum size of 300 μm or less.

7. The computer-generated hologram fabrication process according to claim 4, wherein:
a plurality of sections located parallel with one another at a given spacing are defined, and sample light sources arranged at a given spacing on a sectional line obtained by cutting the surface of the original image by each section are defined, and
for the first original image, sample light sources are defined using sections located at a given spacing of 30 μm or greater, and for the second original image, sample light sources are defined using sections located at a given spacing of less than 30 μm.

8. A hologram-recorded medium having a plurality of original images recorded thereon, wherein:
for each original image, information is recorded in separately different recording areas,
information carried by object light emitted from a multiplicity of sample light sources defined on the original images to be recorded is recorded in each recording area, and
spatial densities of sample light sources on at least two different original images differ from each other, wherein:
a first original image of visually perceivable size and a second original image of visually unperceivable size are defined, and a spatial density of sample light sources defined on the second original image is made higher than that of sample light sources defined on the first original image.

9. The hologram-recorded medium according to claim 8, wherein:
a first recording area is recorded with the first original image represented by a group of sample light sources defined on a plurality of planes located parallel with one another at a given spacing of 30 μm or greater, and
a second recording area is recorded with the second original image represented by a group of sample light sources defined on a plurality of planes located parallel with one another at a given spacing of less than 30 μm.

10. The hologram-recorded medium according to claim 8 or 9, wherein: the second original image comprises a character having a maximum size of 300 μm or less.

11. A hologram-recorded medium having a plurality of original images recorded thereon, wherein:
for each original image, information is recorded in separately different recording areas,
information carried by object light emitted from a multiplicity of sample light sources defined on the original images to be recorded is recorded in each recording area, and
spatial densities of sample light sources on at least two different original images differ from each other, wherein:
a first recording area is recorded with the first original image represented by a group of sample light sources defined on a plurality of planes located parallel with one another at a given spacing of 30 μm or greater, and
a second recording area is recorded with the second original image represented by a group of sample light sources defined on a plurality of planes located parallel with one another at a given spacing of less than 30 μm.

12. The hologram-recorded medium according to claim 11, wherein:
the second original image comprises a character having a maximum size of 300 μm or less.

13. A process of fabricating a computer-generated hologram having an optical pattern formed on a given recording surface by computer-aided computation, which comprises steps of:
defining 2 to K original images, and a recording surface for recording the original images, and
defining a multiplicity of sample light sources on each original image and defining a multiplicity of computation points on the recording surface, so that for each computation point, the complex amplitude at a position of said computation point of object light coming from all or some of the sample light sources is computed thereby defining a specific amplitude and a specific phase at each computation point, and locating a physical cell having optical properties consistent with said specific amplitude and said phase in the vicinity of each computation point, so that a hologram recording surface is formed by a set of physical cells, wherein:
process settings are such that the spatial densities of sample light sources defined on at least two different original images differ from each other, wherein:
a plurality of sections located parallel with one another at a given spacing are defined, and sample light sources arranged at a given spacing on a section line obtained by cutting the surface of the original image by each section are defined, so that the spatial density of the sample light sources is varied by varying a section-to-section spacing for each original image.

14. The computer-generated hologram fabrication process according to claim 13, wherein:
the recording surface intersects each section with a given line of intersection having a given width to form a strip area, and the intensity of interference fringes or the complex amplitude of object light is computed under such conditions that object light emitted from sample light sources arranged on a sectional line obtained by a j-th section arrives only within a strip area formed by a line of intersection of the j-th section with the recording surface.

15. The computer-generated hologram fabrication process according to claim 14, wherein:
the width of the strip area is made narrower than the section-to-section spacing, thereby forming on the recording surface a void space wherein any strip area is not defined, said void space being utilized while the results of computation of the interference waves or the complex amplitude of object light with respect to a strip area adjacent thereto are copied thereto.

16. A process of fabricating a computer-generated hologram having an optical pattern formed on a given recording surface by computer-aided computation, which comprises steps of:
defining 2 to K original images, and a recording surface for recording the original images, and
defining a multiplicity of sample light sources on each original image and defining a multiplicity of computation points on the recording surface, so that for each computation point, the complex amplitude at a position of said computation point of object light coming from all or some of the sample light sources is computed thereby defining a specific amplitude and a specific phase at each computation point, and locating a physical cell having optical properties consistent with said specific amplitude and said phase in the vicinity of each computation point, so that a hologram recording surface is formed by a set of physical cells, wherein:

process settings are such that the spatial densities of sample light sources defined on at least two different original images differ from each other, wherein:

a first original image of visually perceivable size and a second original image of visually unperceivable size are defined, and a spatial density of sample light sources defined on the second original image is made higher than that of sample light sources defined on the first original image.

17. A computer-generated hologram fabrication process according to claim 16, wherein:

the second original image comprises a character.

18. The computer-generated hologram fabrication process according to claim 17, wherein:

the character has a maximum size of 300 μm or less.

19. The computer-generated hologram fabrication process according to claim 16, wherein:

a plurality of sections located parallel with one another at a given spacing are defined, and sample light sources arranged at a given spacing on a sectional line obtained by cutting the surface of the original image by each section are defined, and for the first original image, sample light sources are defined using sections located at a given spacing of 30 μm or greater, and for the second original image, sample light sources are defined using sections located at a given spacing of less than 30 μm.

* * * * *